US008520498B2

(12) United States Patent
Walton et al.

(10) Patent No.: US 8,520,498 B2
(45) Date of Patent: *Aug. 27, 2013

(54) TRANSMIT DIVERSITY AND SPATIAL SPREADING FOR AN OFDM-BASED MULTI-ANTENNA COMMUNICATION SYSTEM

(75) Inventors: Jay Rodney Walton, San Diego, CA (US); John Wendell Ketchum, Harvard, MA (US); Mark S. Wallace, Boxborough, MA (US); Steven J. Howard, Ashland, MA (US); Sanjiv Nanda, Ramona, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 13/461,707

(22) Filed: May 1, 2012

(65) Prior Publication Data

US 2012/0213181 A1 Aug. 23, 2012

Related U.S. Application Data

(63) Continuation of application No. 10/794,918, filed on Mar. 5, 2004, now Pat. No. 8,169,889, which is a continuation-in-part of application No. 10/781,951, filed on Feb. 18, 2004, now abandoned.

(51) Int. Cl.
*H04J 11/10* (2006.01)

(52) U.S. Cl.
USPC .......................................... 370/208; 370/310

(58) Field of Classification Search
USPC ............... 370/203, 208, 209, 295, 307, 310, 370/329, 335, 342, 343, 431, 464, 478–480, 370/491, 536–537
See application file for complete search history.

(56) References Cited

U.S. PATENT DOCUMENTS 5,581,583 A 12/1996 Conti et al.
5,668,837 A 9/1997 Dent
(Continued)

FOREIGN PATENT DOCUMENTS

CA 2490520 A1 12/2003
CN 1476695 A 2/2004
(Continued)

OTHER PUBLICATIONS

Agustin A et al: "LDC Construction with a Defined Structure [MIMO Linear Dispersive Codes]" Vehicular Technology Confernece, 2003. VTC 2003—Fall. 2003 IEEE 58th Orlando, FL, USA Oct. 6-9, 2003, Piscataway NJ, USA, IEEE, US, Oct. 6, 2003, pp. 433-437 vol. 1. XP010700754 ISBN:0-7803-7954-3.

(Continued)

*Primary Examiner* — Michael Thier
*Assistant Examiner* — Curtis A Alia
(74) *Attorney, Agent, or Firm* — QUALCOMM IP Department; James Hunt Yancey, Jr.

(57) ABSTRACT

A multi-antenna transmitting entity transmits data to a single- or multi-antenna receiving entity using (1) a steered mode to direct the data transmission toward the receiving entity or (2) a pseudo-random transmit steering (PRTS) mode to randomize the effective channels observed by the data transmission across the subbands. For transmit diversity, the transmitting entity uses different pseudo-random steering vectors across the subbands but the same steering vector across a packet for each subband. The receiving entity does not need to have knowledge of the pseudo-random steering vectors or perform any special processing. For spatial spreading, the transmitting entity uses different pseudo-random steering vectors across the subbands and different steering vectors across the packet for each subband. Only the transmitting and receiving entities know the steering vectors used for data transmission. Other aspects, embodiments, and features are also claimed and disclosed.

28 Claims, 8 Drawing Sheets

(56) References Cited

U.S. PATENT DOCUMENTS

| | | |
|---|---|---|
| 5,757,845 A | 5/1998 | Fukawa et al. |
| 6,061,023 A | 5/2000 | Daniel et al. |
| 6,118,758 A | 9/2000 | Marchok et al. |
| 6,144,711 A | 11/2000 | Raleigh et al. |
| 6,175,743 B1 | 1/2001 | Alperovich et al. |
| 6,198,775 B1 | 3/2001 | Khayrallah et al. |
| 6,218,985 B1 | 4/2001 | Adams |
| 6,298,035 B1 | 10/2001 | Heiskala |
| 6,314,147 B1 | 11/2001 | Liang et al. |
| 6,351,499 B1 | 2/2002 | Paulraj et al. |
| 6,441,786 B1 | 8/2002 | Jasper et al. |
| 6,452,981 B1 | 9/2002 | Raleigh et al. |
| 6,473,467 B1 | 10/2002 | Wallace et al. |
| 6,477,161 B1 | 11/2002 | Hudson et al. |
| 6,486,828 B1 | 11/2002 | Cahn et al. |
| 6,493,331 B1 | 12/2002 | Walton et al. |
| 6,496,535 B2 | 12/2002 | Xu |
| 6,542,556 B1 | 4/2003 | Kuchi et al. |
| 6,618,454 B1 | 9/2003 | Agrawal et al. |
| 6,636,568 B2 | 10/2003 | Kadous |
| 6,642,888 B2 | 11/2003 | Kishigami et al. |
| 6,678,263 B1 | 1/2004 | Hammons, Jr. et al. |
| 6,694,147 B1 | 2/2004 | Viswanath et al. |
| 6,711,124 B2 | 3/2004 | Khayrallah et al. |
| 6,711,528 B2 | 3/2004 | Dishman et al. |
| 6,760,388 B2 | 7/2004 | Ketchum et al. |
| 6,763,073 B2 | 7/2004 | Foschini et al. |
| 6,771,706 B2 | 8/2004 | Ling et al. |
| 6,785,341 B2 | 8/2004 | Walton et al. |
| 6,788,661 B1 | 9/2004 | Ylitalo et al. |
| 6,801,790 B2 | 10/2004 | Rudrapatna |
| 6,804,307 B1 | 10/2004 | Popovic |
| 6,810,506 B1 | 10/2004 | Levy |
| 6,816,555 B2 | 11/2004 | Sakoda |
| 6,842,487 B1 | 1/2005 | Larsson |
| 6,847,306 B2 | 1/2005 | Diba et al. |
| 6,859,747 B2 | 2/2005 | Yutkowitz |
| 6,862,271 B2 | 3/2005 | Medvedev et al. |
| 6,873,606 B2 | 3/2005 | Agrawal et al. |
| 6,937,189 B2 | 8/2005 | Kim |
| 6,940,917 B2 | 9/2005 | Menon et al. |
| 6,952,454 B1 | 10/2005 | Jalali et al. |
| 6,956,897 B1 | 10/2005 | Honig |
| 6,975,668 B2 | 12/2005 | Zhang |
| 6,982,946 B2 | 1/2006 | Wiberg et al. |
| 6,999,472 B2 | 2/2006 | Hamalainen et al. |
| 7,002,900 B2 | 2/2006 | Walton et al. |
| 7,020,110 B2 | 3/2006 | Walton et al. |
| 7,020,490 B2 | 3/2006 | Khatri |
| 7,024,166 B2 | 4/2006 | Wallace et al. |
| 7,031,669 B2 | 4/2006 | Vaidyanathan et al. |
| 7,057,555 B2 | 6/2006 | Lewis |
| 7,061,969 B2 | 6/2006 | Alamouti et al. |
| 7,065,144 B2 | 6/2006 | Walton et al. |
| 7,065,156 B1 | 6/2006 | Kuchi |
| 7,076,263 B2 | 7/2006 | Medvedev et al. |
| 7,079,870 B2 | 7/2006 | Vaidyanathan |
| 7,092,737 B2 | 8/2006 | Horng et al. |
| 7,095,709 B2 | 8/2006 | Walton et al. |
| 7,095,987 B2 | 8/2006 | Brothers, Jr. et al. |
| 7,099,678 B2 | 8/2006 | Vaidyanathan |
| 7,099,698 B2 | 8/2006 | Tarokh et al. |
| 7,110,350 B2 | 9/2006 | Li et al. |
| 7,110,378 B2 | 9/2006 | Onggosanusi et al. |
| 7,110,463 B2 | 9/2006 | Wallace et al. |
| 7,116,723 B2 | 10/2006 | Kim et al. |
| 7,130,580 B2 | 10/2006 | Alexiou et al. |
| 7,149,254 B2 | 12/2006 | Sampath |
| 7,151,806 B2 | 12/2006 | Hosoda et al. |
| 7,151,809 B2 | 12/2006 | Ketchum et al. |
| 7,158,579 B2 | 1/2007 | Hottinen |
| 7,190,734 B2 | 3/2007 | Giannakis et al. |
| 7,194,042 B2 | 3/2007 | Walton et al. |
| 7,197,084 B2 | 3/2007 | Ketchum et al. |
| 7,200,631 B2 | 4/2007 | Mailaender et al. |
| 7,206,354 B2 | 4/2007 | Wallace et al. |
| 7,227,906 B2 | 6/2007 | Fukuda et al. |
| 7,236,478 B2 | 6/2007 | Wu et al. |
| 7,280,625 B2 | 10/2007 | Ketchum et al. |
| 7,292,623 B2 | 11/2007 | Reznik |
| 7,298,805 B2 | 11/2007 | Walton et al. |
| 7,301,924 B1 | 11/2007 | Gurbuz et al. |
| 7,302,009 B2 | 11/2007 | Walton et al. |
| 7,317,750 B2 | 1/2008 | Shattil |
| 7,324,429 B2 | 1/2008 | Walton et al. |
| 7,324,482 B2 | 1/2008 | Hammons, Jr. et al. |
| 7,327,795 B2 | 2/2008 | Oprea |
| 7,327,798 B2 | 2/2008 | Won |
| 7,327,800 B2 | 2/2008 | Oprea et al. |
| 7,336,746 B2 | 2/2008 | Walton et al. |
| 7,356,073 B2 | 4/2008 | Heikkila |
| 7,359,466 B2 | 4/2008 | Huang et al. |
| 7,385,617 B2 | 6/2008 | Tahat |
| 7,394,754 B2 | 7/2008 | Li et al. |
| 7,436,896 B2 | 10/2008 | Hottinen et al. |
| 7,447,268 B2 | 11/2008 | Sadowsky et al. |
| 7,522,673 B2 | 4/2009 | Giannakis et al. |
| 7,529,177 B2 | 5/2009 | Celebi et al. |
| 7,539,253 B2 | 5/2009 | Li et al. |
| 7,555,053 B2 | 6/2009 | Trachewsky et al. |
| 7,583,747 B1 | 9/2009 | Damen et al. |
| 7,593,317 B2 | 9/2009 | Yuda et al. |
| 7,653,142 B2 | 1/2010 | Ketchum et al. |
| 7,711,762 B2 | 5/2010 | Howard et al. |
| 7,742,546 B2 | 6/2010 | Ketchum et al. |
| 7,764,754 B2 | 7/2010 | Walton et al. |
| 7,787,554 B1 | 8/2010 | Nabar et al. |
| 7,894,548 B2 | 2/2011 | Walton et al. |
| 7,895,254 B2 | 2/2011 | Ketchum et al. |
| 7,899,131 B2 | 3/2011 | Walton et al. |
| 7,907,689 B2 | 3/2011 | Walton et al. |
| 7,974,359 B2 | 7/2011 | Gorokhov et al. |
| 7,978,649 B2 | 7/2011 | Howard et al. |
| 7,978,778 B2 | 7/2011 | Wallace et al. |
| 7,991,065 B2 | 8/2011 | Wallace et al. |
| 8,169,889 B2 | 5/2012 | Walton et al. |
| 8,204,149 B2 | 6/2012 | Walton et al. |
| 8,208,364 B2 | 6/2012 | Walton et al. |
| 8,285,226 B2 | 10/2012 | Lundby et al. |
| 8,290,089 B2 | 10/2012 | Howard et al. |
| 8,325,844 B2 | 12/2012 | Walton et al. |
| 2001/0053124 A1 | 12/2001 | Ichihara et al. |
| 2002/0009125 A1 | 1/2002 | Shi |
| 2002/0091943 A1 | 7/2002 | Lau |
| 2002/0102940 A1 | 8/2002 | Bohnke et al. |
| 2002/0193146 A1 | 12/2002 | Wallace et al. |
| 2002/0196742 A1 | 12/2002 | Baker et al. |
| 2003/0011274 A1 | 1/2003 | Saint-Michel et al. |
| 2003/0026349 A1 | 2/2003 | Onggosanusi et al. |
| 2003/0072254 A1 | 4/2003 | Ma et al. |
| 2003/0112745 A1 | 6/2003 | Zhuang et al. |
| 2003/0123567 A1 | 7/2003 | Shigemasa et al. |
| 2003/0125040 A1 | 7/2003 | Walton et al. |
| 2003/0181211 A1 | 9/2003 | Razavilar et al. |
| 2003/0186698 A1 | 10/2003 | Holma et al. |
| 2003/0189999 A1 | 10/2003 | Kadous |
| 2003/0228850 A1 | 12/2003 | Hwang |
| 2003/0235238 A1 | 12/2003 | Schelm et al. |
| 2003/0235255 A1 | 12/2003 | Ketchum et al. |
| 2004/0002364 A1 | 1/2004 | Trikkonen et al. |
| 2004/0052315 A1 | 3/2004 | Thielecke et al. |
| 2004/0066773 A1 | 4/2004 | Sun et al. |
| 2004/0081263 A1 | 4/2004 | Lee et al. |
| 2004/0082356 A1 | 4/2004 | Walton et al. |
| 2004/0085939 A1 | 5/2004 | Wallace et al. |
| 2004/0136349 A1 | 7/2004 | Walton et al. |
| 2004/0157645 A1 | 8/2004 | Smith et al. |
| 2004/0165675 A1 | 8/2004 | Ito et al. |
| 2004/0190639 A1 | 9/2004 | Pauli et al. |
| 2004/0203473 A1 | 10/2004 | Liu |

| | | | |
|---|---|---|---|
| 2005/0017511 | A1 | 1/2005 | Dalton |
| 2005/0026570 | A1 | 2/2005 | Han |
| 2005/0149320 | A1 | 7/2005 | Kajala et al. |
| 2005/0180312 | A1 | 8/2005 | Walton et al. |
| 2005/0238111 | A1 | 10/2005 | Wallace et al. |
| 2005/0249159 | A1 | 11/2005 | Abraham et al. |
| 2005/0265275 | A1 | 12/2005 | Howard et al. |
| 2005/0267925 | A1 | 12/2005 | Clue |
| 2005/0276347 | A1 | 12/2005 | Mujtaba et al. |
| 2006/0067277 | A1 | 3/2006 | Thomas et al. |
| 2006/0068718 | A1 | 3/2006 | Li et al. |
| 2006/0234789 | A1 | 10/2006 | Tarokh et al. |
| 2006/0274844 | A1 | 12/2006 | Walton et al. |
| 2006/0285531 | A1 | 12/2006 | Howard et al. |
| 2007/0217538 | A1 | 9/2007 | Waxman |
| 2007/0249296 | A1 | 10/2007 | Howard et al. |
| 2008/0095121 | A1 | 4/2008 | Shattil |
| 2008/0273617 | A1 | 11/2008 | Lundby et al. |
| 2009/0290657 | A1 | 11/2009 | Howard et al. |
| 2010/0074301 | A1 | 3/2010 | Howard et al. |
| 2010/0169396 | A1 | 7/2010 | Howard et al. |
| 2011/0142097 | A1 | 6/2011 | Walton et al. |
| 2012/0250788 | A1 | 10/2012 | Walton et al. |

FOREIGN PATENT DOCUMENTS

| | | |
|---|---|---|
| CN | 1592144 A | 3/2005 |
| EP | 0091999 A1 | 10/1983 |
| EP | 0752793 A2 | 1/1997 |
| EP | 0905920 A2 | 3/1999 |
| EP | 1009124 A2 | 6/2000 |
| EP | 1073214 A1 | 1/2001 |
| EP | 1185001 A2 | 3/2002 |
| EP | 1220506 A1 | 7/2002 |
| EP | 1223702 A1 | 7/2002 |
| EP | 1241824 | 9/2002 |
| EP | 1353452 A2 | 10/2003 |
| EP | 1361686 | 11/2003 |
| EP | 1396956 A1 | 3/2004 |
| JP | 11163822 A | 6/1999 |
| JP | 11205026 A | 7/1999 |
| JP | 2001237751 A | 8/2001 |
| JP | 2002503048 T | 1/2002 |
| JP | 2002524972 | 8/2002 |
| JP | 2004023416 A | 1/2004 |
| JP | 2004064654 A | 2/2004 |
| JP | 2004072150 A | 3/2004 |
| JP | 2004096753 A | 3/2004 |
| JP | 2004509556 A | 3/2004 |
| JP | 2004104790 A | 4/2004 |
| JP | 2005524331 T | 8/2005 |
| JP | 2007504188 A | 3/2007 |
| JP | 2007515829 T | 6/2007 |
| JP | 2007523549 T | 8/2007 |
| JP | 2007523550 T | 8/2007 |
| JP | 2007529972 T | 10/2007 |
| JP | 2007538414 T | 12/2007 |
| KR | 200260860 | 7/2002 |
| RU | 2103768 C1 | 1/1998 |
| RU | 2111619 C1 | 5/1998 |
| RU | 2116698 C1 | 7/1998 |
| RU | 2202152 | 4/2003 |
| RU | 2238611 C1 | 10/2004 |
| TW | 341680 | 10/1998 |
| TW | 350047 | 1/1999 |
| TW | 466385 B | 12/2001 |
| TW | 510103 B | 11/2002 |
| TW | 200304287 | 9/2003 |
| WO | 9737456 A2 | 10/1997 |
| WO | 0014921 A1 | 3/2000 |
| WO | 0044144 A1 | 7/2000 |
| WO | 0156218 A1 | 8/2001 |
| WO | 0219565 A2 | 3/2002 |
| WO | 0225857 A1 | 3/2002 |
| WO | 03056742 A1 | 7/2003 |
| WO | 03063526 A1 | 7/2003 |
| WO | 03094386 A1 | 11/2003 |
| WO | 03101029 A1 | 12/2003 |
| WO | 2004043082 A2 | 5/2004 |
| WO | 2005088882 A1 | 9/2005 |
| WO | 2005099211 A1 | 10/2005 |

OTHER PUBLICATIONS

Alamouti, S.M., "A Simple Transmit Diversity Technique for Wireless Communications," IEEE Journal on Select Areas in Communications, vol. 16, No. 8, Oct. 1998, pp. 1451-1458.

Antenna-Theory.com, "Steering Vector", http://www.antenna-theory.com, pp. 1., No date given.

Auer, G., "Channel Estimation for OFDM With Cyclic Delay Diversity," Personal, Indoor and Mobile Radio Communications, 2004. PIMRC 2004, 15th IEEE International Symposium on Sep. 5, 2004, vol. 3, pp. 1792-1796.

Bauch, et al., "Orthogonal Frequency Division Multiple Access with Cyclic Delay Diversity," ITG Workshop on Smart Antennas, Munich Germany, Mar. 18-19, 2004, pp. 17-24.

Bello: "Characterization of Randomly Time-Variante Linear Channels," Communications Systems, IEEE transactions on, vol. 11, Issue 4, pp. 360-393, Dec. 1963.

Bem et al., "Smart Antennas for Mobile Communications Systems," International Conference on Microwaves, Radar and Wireless Communications, vol. 3, May 22, 2000, pp. 120-130, XP010537479.

Bourdoux et al., "Non-reciprocal transceivers in OFDM/SDMA Systems: Impact and Mitigation," Radio and Wireless Conference, Aug. 10, 2003, pp. 183-186, XP010656728.

Branka et al., "Performance Limits of Multiple-Input Multiple-Output Wireless Communication Systems", Space-Time Coding, John Wiley& Sons. Ltd, Apr. 2003, England, pp. 1-9.

Bruhl et al., "Investigation of Front-end Requirements for MIMO—Systems Using Downlink Pre-Distortion," European Personal Mobile Communications Conference, 2003, pp. 472-476, XP002330243.

Chapter 10, Eigenvalues and Singular Values, pp. 1-39.

Crow, "The Fourier Matrix", Apr. 27, 2001, http://www.maths.abdn.ac.uk/~igc/tch/mx4002/notes/node91.html, pp. 1-3.

Dammann, A. et al., "Beamforming in Combination with Space-Time Diversity for Broadband OFDM Systems", ICC 2002. 2002 IEEE International Conference on Communications. Apr. 28-May 2, 2002, pp. 165-171, XP010589479.

Doonstnejad et al, "Space-time Spreading Codes for a Multiuser MIMO System," Institute of Electrical and Electronics Engineers, Conference Record of the 36th. Asilomar Conference on Signals, Systems, & Computers, Pacific Grove, California, Nov. 3-6, 2002, pp. 1374-1378, XP10638423.

Farrokhi et al., "Link-Optimal Space-Time Processing with Multiple Transmit and Receive Antennas, " IEEE Communications Letters, vol. 5, No. 3, pp. 85-87(Mar. 2001).

Giacomantone, Javier Oscar, "Tradeoffs in Arithmetic Architectures for CORDIC Algorithm Design.", pp. 1-9, CeTAD—Fac. De Ingenieria—UNLP, Argentina [presented at IBERCHIP VII Workshop, Session 4, Montevideo, Uruguay, Mar. 21-23, 2001].

Gilbert et al., "Linear algebra and matrix theory," pressed by Academic Press Inc, Ch. 7, pp. 272-296 Dec. 31, 1995.

Goldsmith, Andrea et al., "Capacity Limits of MIMO Channels," IEEE Journal on Selected Areas in Communications, vol. 21, No. 5, pp. 684-702, Jun. 2003.

Gotze, J., et al., "An Algorithm and Architecture Based on Orthonormal Mu-Rotations for Computing the Symmetric EVD" Integration, The VLSI Journal, North-Holland Publishing Company. Amsterdam, NL, vol. 20, No. 1, Dec. 1, 1995, pp. 21-39.

Griffin, Grant R., "Cordic FAQ," Iowegian's dspGuru. pp. 1-6.

Hanzo et al., Single and Multi-Carrier Ds-CDMA, "Space-Time Spreading Aided Single-Carrier Wideband CDMA Communicating Over Multipath Nakagami Fading Channels," Chapter 8, pp. 279-310, John Wiley & Sons, England, 2003 (XP-002357231).

Hemkumar N. D., et al. "Efficient Complex Matrix Transformations with CORDIC" Computer Arithmetic, 1994. Proceedings., 11th Symposium on Windsor, Ont., Canada Jun. 29-Jul. 2, 1993, Los Alamitos, CA, USA, IEEE Comput. Soc, Jun. 29, 1993, pp. 122-129.

Hochwald et al., "A Transmitter Diversity Scheme for Wideband CDMA Systems based on Space-time Spreading", Selected Areas in Communications, vol. 19, No. 1, Jan. 2001.

Hochwald et al., "Unitary Space-Time Modulation for Multiple-Antenna Communications in Rayleigh Flat Fading," IEEE Transactions on Information Theory, vol. 46, No. 2, pp. 543-564 (2000).

Hochwald, et al., "Systematic Design of Unitary Space-Time Constellations," IEEE Transactons on Information Theory, 2000, 46 (6), 1962-1973.

Hsiao, S. et al.: "Parallel Singular Value Decomposition of Complex Matrices Using Multidimensional CORDIC Algorithms" IEEE Transactions of Signal Processing, IEEE Service Center, New York, NY, UA, vol. 44, No. 3, pp. 685-697, Mar. 1, 1996.

IEEE Std 802.11a-1999 (Supplement to IEEE Std 801.11-1999) "Part 11: Wireless LAN Medium Access Control (MAC) and Physical Layer (PHY) specifications: High-Speed physical Layer in the 5GHZ Band", pp. 1-90, Sep. 1999.

IEEE Std. 802.11g IEEE Standard for Information technology-Telecommunications and information exchange between systems—Local and metropolitan area networks—Specific requirements—Part 11: Wireless LAN Medium Access Control (MAC) and Physical Layer (PHY) Specifications, Amendment 4: Further Higher Data Rate Extension in the 2.4 GHz Band, LAN/MAN Standards Committee IEEE Computer Society Jun. 27, 2003, pp. i-x & 1-67.

International Search Report—PCT/US2005/007020, International Search Authority—European Patent Office, Jul. 6, 2005.

Jihoon Choi et al., "Interpolation Based Transmit Beamforming for MIMO-OFDM with Limited Feedback", IEEE Communications Society, 2004, 249-253, Austin, Texas.

Jungnickel et al., "A Mimo System with Reciprocal Transceivers for the Time-division Duplex Mode," Antennas and Propagation Society International Symposium, vol. 2, Jun. 20, 2004, pp. 1267-1270, XP010721570.

Kaiser, "Spatial Transmit Diversity Techniques for Broadband OFDM Systems," IEEE Global Telecommunications Conference, 2000. GLOBECOM '00. San Francisco, CA, Nov. 27-Dec. 1, 2000, vol. 3, pp. 1824-1828, XP001195742.

Ketchum, John, et al., "PHY Design for Spatial Multiplexing MIMO WLAN," IEEE 802.11-04/0721r0, IEEE, Jul. 2004, pp. 1-33 (Spatial Spreading Mode, Intrinsic Transmission Mode).

Kim, M. et al.: "Design of Jacobi EVD Processor Based on CORDIC for DOA Estimation with Music Algorithm." Personal, Indoor, and Mobile Radio Communications, 2002. pp. 120-124, The 13th IEEE International Symposium on Sep. 15-18, 2002, Piscataway, NJ, USA, IEEE.

Laroia R et al., "Enhanced Opportunistic Beamforming," Vehicular Technology Conference, 2003. VTC 2003—Fall. IEEE 58th Orlando, FL, USA Oct. 6-9, 2003, pp. 1762-1766, XP010702878.

Li, et al., "Transmit Diversity Over Quasi-Static Fading Channels Using Multiple Antennas and Random Signal Mapping," IEEE Transactions on Communications, vol. 51, No. 11, Nov. 2003, pp. 1918-1926.

Liu et al., "OFDM-MIMO WLAN AP Front-end Gain and Phase Mismatch Calibration," IEEE Radio and Wireless Conference, Sep. 2004, pp. 151-154, XP002330244.

Liu, Jung-Tao: "Successive decoding of multiple space time coded streams in multi-input multi-output systems," Global Telecommunications Conference, 2002. Globecom '02. IEEE, USA, Nov. 21, 2002, 1007-1011 vol. 1.

Medles et al., "Multistream Space-Time Coding by Spatial Spreading, Scrambling and Delay Diversity," IEEE International Conference on Acoustics, Speech and Signal Processing, vol. 4 of 4, XP-10803892, pp. 2429-2432 (2002).

Michalke C et al: Efficient tracking of eigenspaces and its application to eigenbeanforming Personal, Indoor and Mobile Radio Communications 14th IEEE Proceedings, Sep. 7, 2003, pp. 2847-2851, Sections II.B and III.C XP010678152.

Narula, et al., "Performance Limits of Coded Diversity Methods for Transmitter Antenna Arrays," IEEE Transactions on Information Theory, vol. 45, No. 7, Nov. 1999, pp. 2418-2433.

Nowak, et al., "An Efficient Implementation of a 256-point FFT Processor with CORDIC for OFDM Systems," Delft University of Technology, Faculty of Information Technology and Systems Circuits and Systems Group, pp. 427-434, ISBN: 90-73461-15-4. 1998. STW, 1998 1026-01:.

Oksa G et al: "Multi-level parallelism in the block-Jacobi SVD algorithm" Parallel and Distribution Processing, 2001. Proceedings. Ninth Euromicr O Workshop. IEEE, Feb. 7, 2001, pp. 306-313, XP010532138, ISBN: 978-0-7695-0987-7.

Pan, et al., "Dynamic Sub-channel Allocation with Adaptive Beamforming for Broadband OFDM Wireless Systems," IEEE Global Telecommunications Conference, 2002. GLOBECOM '02. Taipei, Taiwan, Nov. 17-21, 2002, New York, NY, Nov. 17, 2002, vol. 1, pp. 711-715.

Ralf Seeger et al: "Advance Eigenbeamforming for the 3GPP UMTS FDD Downlink" ITG IEEE Workshop on Smart Antennas, XX, XX, Apr. 4, 2004, pp. 1-8, XP002468805, Section III.

Schafer F., et al.: "Efficient Tracking of Eigenspaces and its application to MIMO systems" Proceedings of the IST Mobile and Wireless Communications Summit, Jun. 18, 2003, pp. 1-6, XP002478514.

Sharif et al., "On the Capacity of MIMO Broadcast Channel with Partial Side Information", Department of Electrical Engineering, CA Institute of Engineering, IEEE 2002, pp. 958-962.

Suthaharan, et al., Space-time coded MIMO-OFDM for high capacity and high data-rate wireless communication over frequency selective fading channels, Mobile and Wireless Communications Networks, 2002. 4th International Workshop on, USA, Sep. 11, 2002, 424-428.

Taiwan Search Report—TW094106644—TIPO—Mar. 7, 2012.

T.L. Marzetta, B. Hassibi, B.M Hochwald, "Structured Unitary Space-Time Autocoding Constellations," IEEE Trans. on IT,vol. 48, No. 4, Apr. 2002.

Winters, J. "Smart antennas for wireless systems", IEEE Personal Communications, Dec. 5, 2003, pp. 1-113.

Written Opinion—PCT/US05/007020, International Search Authority—European Patent Office, Jul. 6, 2005.

Yao, Huan, "Efficient Signal, Code, and Receiver Designs for Mimo Communication Systems," Ph.D. Thesis, Massachusetts Institute of Technology, Cambridge, Massachusetts, May 21, 2003, 205 pages.

Yu and Cioffi, "Trellis Precoding for the Broadcast Channel," IEEE Global Telecommunications Conference, vol. 2, Electrical Engineering Department, Stanford, University, Stanford, California (2001), pp. 1344-1348.

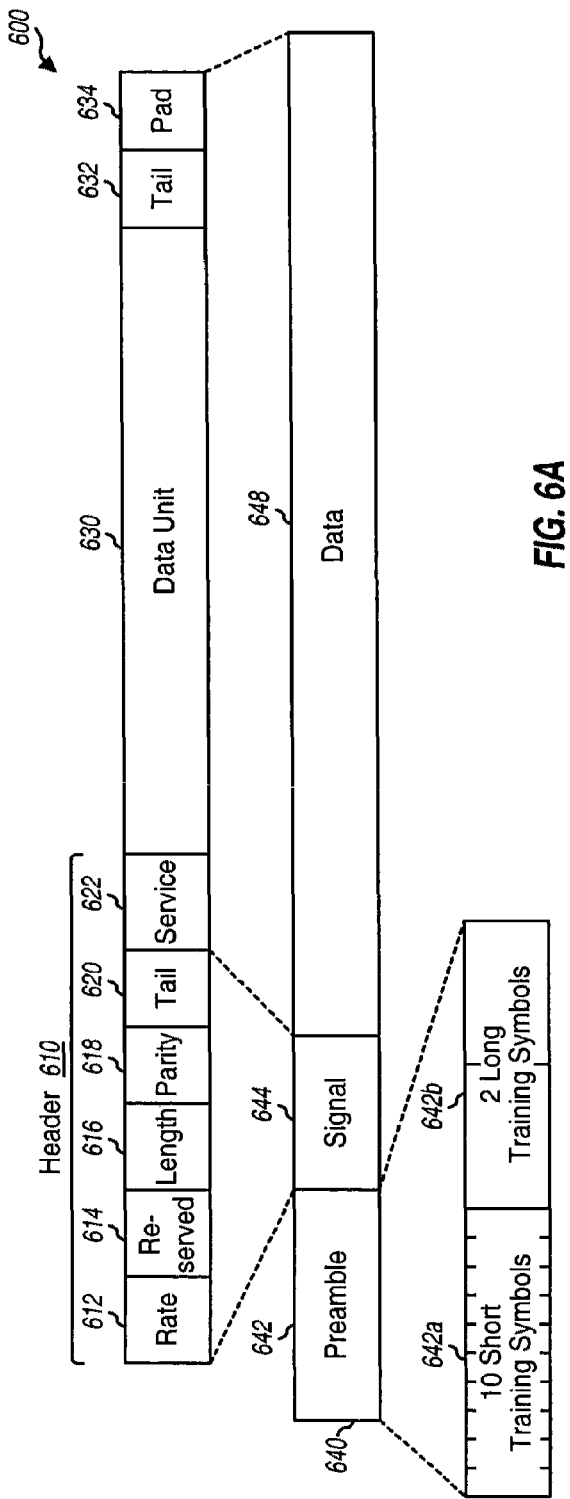
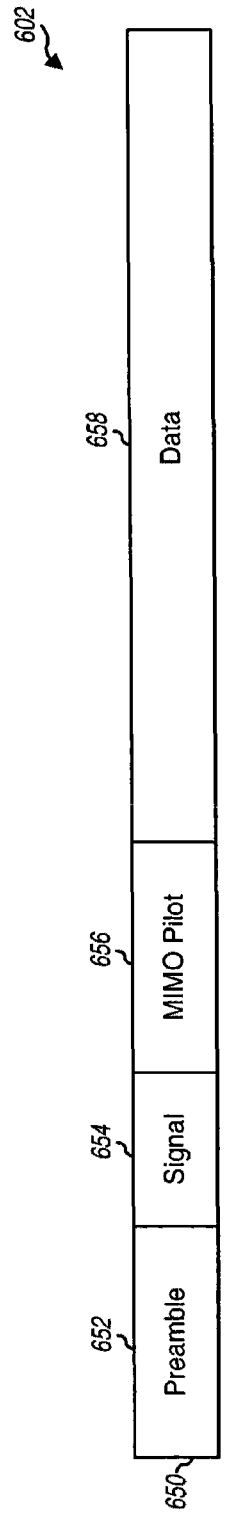
FIG. 6A
FIG. 6B

US 8,520,498 B2

TRANSMIT DIVERSITY AND SPATIAL SPREADING FOR AN OFDM-BASED MULTI-ANTENNA COMMUNICATION SYSTEM

CROSS REFERENCE TO RELATED APPLICATIONS & PRIORITY CLAIMS

This patent application is a continuation of U.S. patent application Ser. No. 10/794,918, filed 5 Mar. 2004, which is a continuation-in-part of U.S. patent application Ser. No. 10/781,951, filed 18 Feb. 2004.

TECHNICAL FIELD

Embodiments of the present invention relates generally to communication, and more specifically to techniques for transmitting data in a multi-antenna communication system that utilizes orthogonal frequency division multiplexing (OFDM).

BACKGROUND

OFDM is a multi-carrier modulation technique that effectively partitions the overall system bandwidth into multiple ($N_F$) orthogonal subbands, which are also referred to as tones, subcarriers, bins, and frequency channels. With OFDM, each subband is associated with a respective subcarrier that may be modulated with data. OFDM is widely used in various wireless communication systems, such as those that implement the well-known IEEE 802.11a and 802.11g standards. IEEE 802.11a and 802.11g generally cover single-input single-output (SISO) operation whereby a transmitting device employs a single antenna for data transmission and a receiving device normally employs a single antenna for data reception.

A multi-antenna communication system includes single-antenna devices and multi-antenna devices. In this system, a multi-antenna device may utilize its multiple antennas for data transmission to a single-antenna device. The multi-antenna device and single-antenna device may implement any one of a number of conventional transmit diversity schemes in order to obtain transmit diversity and improve performance for the data transmission. One such transmit diversity scheme is described by S. M. Alamouti in a paper entitled "A Simple Transmit Diversity Technique for Wireless Communications," IEEE Journal on Selected Areas in Communications, Vol. 16, No. 8, October 1998, pp. 1451-1458. For the Alamouti scheme, the transmitting device transmits each pair of data symbols from two antennas in two symbol periods, and the receiving device combines two received symbols obtained for the two symbol periods to recover the pair of data symbols. The Alamouti scheme as well as most other conventional transmit diversity schemes require the receiving device to perform special processing, which may be different from scheme to scheme, in order to recover the transmitted data and obtain the benefits of transmit diversity.

However, a single-antenna device may be designed for SISO operation only, as described below. This is normally the case if the wireless device is designed for the IEEE 802.11a or 802.11g standard. Such a "legacy" single-antenna device would not be able to perform the special processing required by most conventional transmit diversity schemes. Nevertheless, it is still highly desirable for a multi-antenna device to transmit data to the legacy single-antenna device in a manner such that improved reliability and/or performance can be achieved.

BRIEF SUMMARY

Techniques for transmitting data from a multi-antenna transmitting entity to a single-antenna receiving entity using a steered mode and/or a pseudo-random transmit steering (PRTS) mode are described herein. In the steered mode, the transmitting entity performs spatial processing to direct the data transmission toward the receiving entity. In the PRTS mode, the transmitting entity performs spatial processing such that the data transmission observes random effective SISO channels across the subbands, and performance is not dictated by a bad channel realization. The transmitting entity may use (1) the steered mode if it knows the response of the multiple-input single-output (MISO) channel for the receiving entity and (2) the PRTS mode even if it does not know the MISO channel response.

The transmitting entity performs spatial processing with (1) steering vectors derived from the MISO channel response estimates for the steered mode and (2) pseudo-random steering vectors for the PRTS mode. Each steering vector is a vector with $N_T$ elements, which can be multiplied with a data symbol to generate $N_T$ transmit symbols for transmission from $N_T$ transmit antennas, where $N_T>1$.

The PRTS mode may be used to achieve transmit diversity without requiring the receiving entity to perform any special processing. For transmit diversity, the transmitting entity uses (1) different pseudo-random steering vectors across the subbands used for data transmission and (2) the same steering vector across the pseudo-random steered portion of a protocol data unit (PDU) for each subband. A PDU is a unit of transmission. The receiving entity does not need to have knowledge of the pseudo-random steering vectors used by the transmitting entity. The PRTS mode may also be used to achieve spatial spreading, e.g., for secure data transmission. For spatial spreading, the transmitting entity uses (1) different pseudo-random steering vectors across the subbands and (2) different steering vectors across the pseudo-random steered portion of the PDU for each subband. For secure data transmission, only the transmitting and receiving entities know the steering vectors used for data transmission.

The steered and PRTS modes may also be used for data transmission from a multi-antenna transmitting entity to a multi-antenna receiving entity, as described below. Various aspects and embodiments of the invention are also described in further detail below.

BRIEF DESCRIPTION OF THE DRAWINGS

FIGS. 6A and 6B show two specific PDU formats.

DETAILED DESCRIPTION

Figure 1:
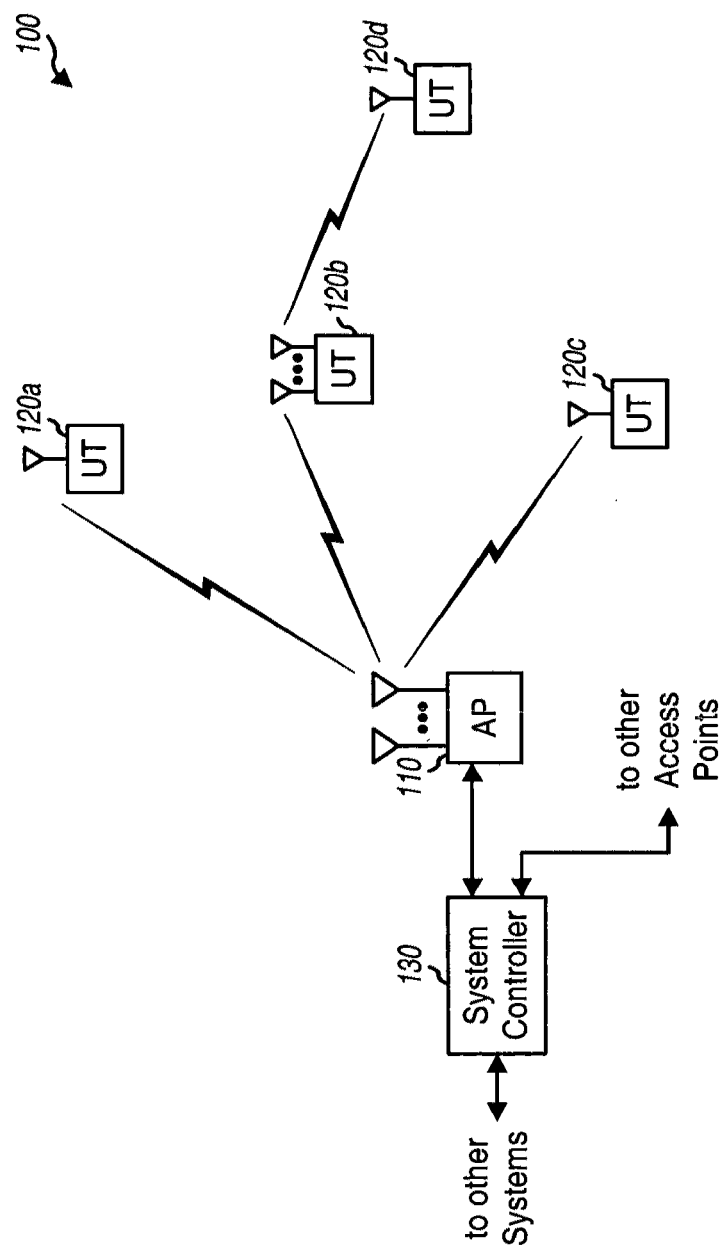
FIG. 1 shows a multi-antenna communication system.

The word "exemplary" is used herein to mean "serving as an example, instance, or illustration." Any embodiment described herein as "exemplary" is not necessarily to be construed as preferred or advantageous over other embodiments.

FIG. 1 shows a multi-antenna system 100 with an access point (AP) 110 and user terminals (UTs) 120. An access point is generally a fixed station that communicates with the user terminals and may also be referred to as a base station or some other terminology. A user terminal may be fixed or mobile and may also be referred to as a mobile station, a wireless device, a user equipment (UE), or some other terminology. A system controller 130 couples to the access points and provides coordination and control for these access points.

Access point 110 is equipped with multiple antennas for data transmission. Each user terminal 120 may be equipped with a single antenna or multiple antennas for data transmission. A user terminal may communicate with the access point, in which case the roles of access point and user terminal are established. A user terminal may also communicate peer-to-peer with another user terminal. In the following description, a transmitting entity may be an access point or a user terminal, and a receiving entity may also be an access point or a user terminal. The transmitting entity is equipped with multiple ($N_T$) transmit antennas, and the receiving entity may be equipped with a single antenna or multiple ($N_R$) antennas. A MISO transmission exists when the receiving entity is equipped with a single antenna, and a multiple-input multiple-output (MIMO) transmission exists when the receiving entity is equipped with multiple antennas.

System 100 may utilize a time division duplex (TDD) or a frequency division duplex (FDD) channel structure. For the TDD structure, the downlink and uplink share the same frequency band, with the downlink being allocated a portion of the time and the uplink being allocated the remaining portion of the time. For the FDD structure, the downlink and uplink are allocated separate frequency bands. For clarity, the following description assumes that system 100 utilizes the TDD structure.

System 100 also utilizes OFDM for data transmission. OFDM provides $N_F$ total subbands, of which $N_D$ subbands are used for data transmission and are referred to as data subbands, $N_P$ subbands are used for a carrier pilot and are referred to as pilot subbands, and the remaining $N_G$ subbands are not used and serve as guard subbands, where $N_F=N_D+N_P+N_G$. In each OFDM symbol period, up to $N_D$ data symbols may be sent on the $N_D$ data subbands, and up to $N_P$ pilot symbols may be sent on the $N_P$ pilot subbands. As used herein, a "data symbol" is a modulation symbol for data, and a "pilot symbol" is a modulation symbol for pilot. The pilot symbols are known a priori by both the transmitting and receiving entities.

For OFDM modulation, $N_F$ frequency-domain values (for $N_D$ data symbols, $N_P$ pilot symbols, and $N_G$ zeros) are transformed to the time domain with an $N_F$-point inverse fast Fourier transform (IFFT) to obtain a "transformed" symbol that contains $N_F$ time-domain chips. To combat intersymbol interference (ISI), which is caused by frequency selective fading, a portion of each transformed symbol is repeated to form a corresponding OFDM symbol. The repeated portion is often referred to as a cyclic prefix or guard interval. An OFDM symbol period (which is also referred to herein as simply a "symbol period") is the duration of one OFDM symbol.

Figure 2:
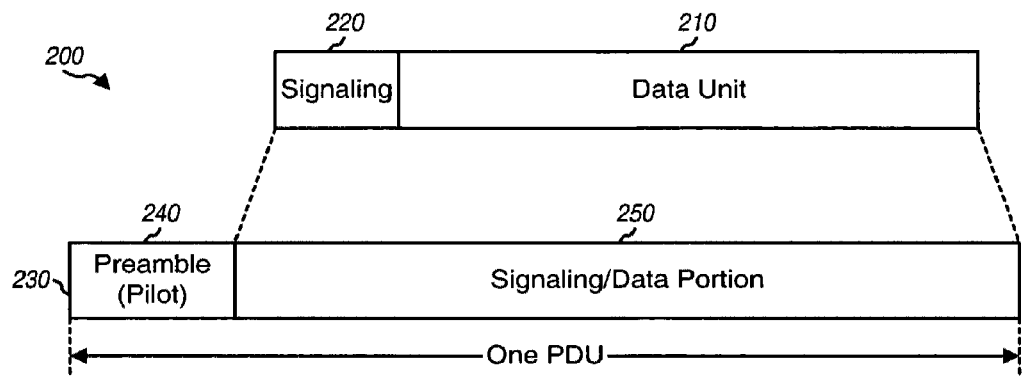
FIG. 2 shows a generic PDU format.

FIG. 2 shows an exemplary protocol data unit (PDU) format 200 that may be used for system 100. Data is processed at a higher layer as data units. Each data unit 210 is coded and modulated (or symbol mapped) separately based on a coding and modulation scheme selected for that data unit. Each data unit 210 is associated with a signaling portion 220 that carries various parameters (e.g., the rate and length) for that data unit, which are used by the receiving entity to process and recover the data unit. The signaling portion may be processed with the same or different coding and modulation scheme than that used for the data unit. Each data unit and its signaling portion are OFDM modulated to form a signaling/data portion 240 of a PDU 230. The data unit is transmitted across both subbands and symbol periods in the data portion of the PDU. PDU 230 further includes a preamble 240 that carries one or more types of pilot used for various purposes by the receiving entity. In general, preamble 240 and signaling/data portion 250 may each be fixed or variable length and may contain any number of OFDM symbols. PDU 230 may also be referred to as a packet or some other terminology.

The receiving entity typically processes each PDU separately. The receiving entity uses the preamble of the PDU for automatic gain control (AGC), diversity selection (to select one of several input ports to process), timing synchronization, coarse and fine frequency acquisition, channel estimation, and so on. The receiving entity uses the information obtained from the preamble to process the signaling/data portion of the PDU.

In general, pseudo-random transmit steering may be applied to an entire PDU or a portion of the PDU, depending on various factors. The pseudo-random steered portion of a PDU may thus be all or a portion of the PDU.

1. MISO Transmission

In system 100, a MISO channel exists between a multi-antenna transmitting entity and a single-antenna receiving entity. For an OFDM-based system, the MISO channel formed by the $N_T$ antennas at the transmitting entity and the single antenna at the receiving entity may be characterized by a set of $N_F$ channel response row vectors, each of dimension $1 \times N_T$, which may be expressed as:

$$\underline{h}(k)=[h_1(k) h_2(k) \ldots h_{N_T}(k)], \text{ for } k \in K, \qquad \text{Eq (1)}$$

where entry $h_j(k)$, for $j=1 \ldots N_T$, denotes the coupling or complex gain between transmit antenna j and the single receive antenna for subband k, and K denotes the set of $N_F$ subbands. For simplicity, the MISO channel response $\underline{h}(k)$ is assumed to be constant across each PDU and is thus a function of only subband k.

The transmitting entity may transmit data from its multiple antennas to the single-antenna receiving entity in a manner such that improved reliability and/or performance can be achieved. Moreover, the data transmission may be such that the single-antenna receiving entity can perform the normal processing for SISO operation (and does not need to do any other special processing for transmit diversity) to recover the data transmission.

The transmitting entity may transmit data to the single-antenna receiving entity using the steered mode or the PRTS mode. In the steered mode, the transmitting entity performs spatial processing to direct the data transmission toward the receiving entity. In the PRTS mode, the transmitting entity performs spatial processing such that the data transmission observes random effective SISO channels across the subbands. The PRTS mode may be used to achieve transmit diversity without requiring the receiving entity to perform any special processing. The PRTS mode may also be used to achieve spatial spreading, e.g., for secure data transmission. Both of these modes and both of these applications for the PRTS mode are described below.

A. Steered Mode for MISO

The transmitting entity performs spatial processing for each subband for the steered mode, as follows:

$$\underline{x}_{miso,sm}(n,k) = \underline{v}_{sm}(k) \cdot s(n,k), \qquad \text{Eq (2)}$$

where
- $s(n,k)$ is a data symbol to be sent on subband k in symbol period n;
- $\underline{v}_{sm}(k)$ is an $N_T \times 1$ steering vector for subband k in symbol period n; and
- $\underline{x}_{miso,sm}(n,k)$ is an $N_T \times 1$ vector with $N_T$ transmit symbols to be sent from the $N_T$ transmit antennas on subband k in symbol period n.

In the following description, the subscript "sm" denotes the steered mode, "pm" denotes the PRTS mode, "miso" denotes MISO transmission, and "mimo" denotes MIMO transmission. With OFDM, one substream of data symbols may be sent on each data subband. The transmitting entity performs spatial processing for each data subband separately.

For the steered mode, steering vectors $\underline{v}_{sm}(k)$ are derived based on the channel response row vector $\underline{h}(k)$, as follows:

$$\underline{v}_{sm}(k) = \underline{h}^H(k) \text{ or } \underline{v}_{sm}(k) = \arg\{\underline{h}^H(k)\}, \qquad \text{Eq (3)}$$

where $\arg\{\underline{h}^H(k)\}$ denotes the argument of $\underline{h}^H(k)$ and "H" denotes the complex conjugate transpose. The argument provides elements having unit magnitude and different phases determined by the elements of $\underline{h}(k)$, so that the full power of each transmit antenna may be used for data transmission. Since the channel response $\underline{h}(k)$ is assumed to be constant across each PDU, the steering vector $\underline{v}_{sm}(k)$ is also constant across the PDU and is a function of only subband k.

The received symbols at the receiving entity may be expressed as:

$$\begin{aligned} r_{sm}(n, k) &= \underline{h}(k) \cdot \underline{x}_{miso,sm}(n, k) + z(n, k) \qquad \text{Eq (4)} \\ &= \underline{h}(k) \cdot \underline{v}_{sm}(k) \cdot s(n, k) + z(n, k) \\ &= h_{\mathit{eff},sm}(k) \cdot s(n, k) + z(n, k), \end{aligned}$$

where
- $r_{sm}(n,k)$ is a received symbol for subband k in symbol period n;
- $h_{\mathit{eff},sm}(k)$ is an effective SISO channel response for subband k, which is $h_{\mathit{eff},sm}(k) = \underline{h}(k) \cdot \underline{v}_{sm}(k)$; and
- $z(n,k)$ is the noise for subband k in symbol period n.

As shown in equation (4), the spatial processing by the transmitting entity results in the data symbol substream for each subband k observing the effective SISO channel response $h_{\mathit{eff},sm}(k)$, which includes the actual MISO channel response $\underline{h}(k)$ and the steering vector $\underline{v}_{sm}(k)$. The receiving entity can estimate the effective SISO channel response $h_{\mathit{eff},sm}(k)$, for example, based on pilot symbols received from the transmitting entity. The receiving entity can then perform detection (e.g., matched filtering) on the received symbols $r_{sm}(n,k)$ with the effective SISO channel response estimate, $\hat{h}_{\mathit{eff},sm}(k)$, to obtain detected symbols $\hat{s}(n,k)$, which are estimates of the transmitted data symbols $s(n,k)$.

The receiving entity may perform matched filtering as follows:

$$\hat{s}(n, k) = \frac{\hat{h}^*_{\mathit{eff},sm}(k) \cdot r(n, k)}{\left|\hat{h}_{\mathit{eff},sm}(k)\right|^2} = s(n, k) + z'(n, k), \qquad \text{Eq (5)}$$

where "*" denotes a conjugate. The detection operation in equation (5) is the same as would be performed by the receiving entity for a SISO transmission. However, the effective SISO channel response estimate, $\hat{h}_{\mathit{eff},sm}(k)$, is used for detection instead of a SISO channel response estimate.

B. PRTS Mode for Transmit Diversity

For the PRTS mode, the transmitting entity uses pseudo-random steering vectors for spatial processing. These steering vectors are derived to have certain desirable properties, as described below.

To achieve transmit diversity with the PRTS mode, the transmitting entity uses the same steering vector across the pseudo-random steered portion of a PDU for each subband k. The steering vectors would then be a function of only subband k and not symbol period n, or $\underline{v}_{pm}(k)$. In general, it is desirable to use as many different steering vectors as possible across the subbands to achieve greater transmit diversity. For example, a different steering vector may be used for each data subband. A set of $N_D$ steering vectors, denoted as $\{\underline{v}_{pm}(k)\}$, may be used for spatial processing for the $N_D$ data subbands. The same steering vector set $\{\underline{v}_{pm}(k)\}$ is used for each PDU (e.g., across the preamble and signal/data portion for the PDU format shown in FIG. 2). The steering vector set may be the same or may change from PDU to PDU.

The transmitting entity performs spatial processing for each subband as follows:

$$\underline{x}_{miso,pm}(n,k) = \underline{v}_{pm}(k) \cdot s(n,k). \qquad \text{Eq (6)}$$

One set of steering vectors $\{\underline{v}_{pm}(k)\}$ is used across all OFDM symbols in the PDU.

The received symbols at the receiving entity may be expressed as:

$$\begin{aligned} r_{td}(n, k) &= \underline{h}(k) \cdot \underline{x}_{miso,pm}(n, k) + z(n, k) \qquad \text{Eq (7)} \\ &= \underline{h}(k) \cdot \underline{v}_{pm}(k) \cdot s(n, k) + z(n, k) \\ &= h_{\mathit{eff},td}(k) \cdot s(n, k) + z(n, k). \end{aligned}$$

The effective SISO channel response $h_{\mathit{eff},td}(k)$ for each subband is determined by the actual MISO channel response $\underline{h}(k)$ for that subband and the steering vector $\underline{v}_{pm}(k)$ used for the subband. The effective SISO channel response $h_{\mathit{eff},td}(k)$ for each subband k is constant across the PDU because the actual channel response $\underline{h}(k)$ is assumed to be constant across the PDU and the same steering vector $\underline{v}_{pm}(k)$ is used across the PDU.

The receiving entity receives the transmitted PDU and derives an effective SISO channel response estimate, $\hat{h}_{\mathit{eff},td}(k)$, for each data subband based on the preamble. The receiving entity then uses the effective SISO channel response estimates, $\hat{h}_{\mathit{eff},td}(k)$, to perform detection on the receive symbols in the signaling/data portion of the PDU, as shown in equation (5), where $\hat{h}_{\mathit{eff},td}(k)$ substitutes for $\hat{h}_{\mathit{eff},sm}(k)$.

For transmit diversity, the receiving entity does not need to know whether a single antenna or multiple antennas are used for data transmission, and does not need to know the steering vector used for each subband. The receiving entity can nevertheless enjoy the benefits of transmit diversity since different steering vectors are used across the subbands and different effective SISO channels are formed for these subbands. Each PDU would then observe an ensemble of pseudo-random SISO channels across the subbands used to transmit the PDU.

C. PRTS Mode for Spatial Spreading

Spatial spreading may be used to randomize a data transmission across spatial dimension. Spatial spreading may be used for secure data transmission between a transmitting entity and a recipient receiving entity to prevent unauthorized reception of the data transmission by other receiving entities.

For spatial spreading in the PRTS mode, the transmitting entity uses different steering vectors across the pseudo-random steered portion of a PDU for each subband k. The steering vectors would then be a function of both subband and symbol period, or $\underline{v}_{pm}(n,k)$. In general, it is desirable to use as many different steering vectors as possible across both subbands and symbol periods to achieve a higher degree of spatial spreading. For example, a different steering vector may be used for each data subband for a given symbol period, and a different steering vector may be used for each symbol period for a given subband. A set of $N_D$ steering vectors, denoted as $\{\underline{v}(n,k)\}$, may be used for spatial processing for the $N_D$ data subbands for one symbol period, and a different set may be used for each symbol period across the PDU. At a minimum, different sets of steering vectors are used for the preamble and the signaling/data portion of the PDU, where one set may include vectors of all ones. The steering vector sets may be the same or may change from PDU to PDU.

The transmitting entity performs spatial processing for each subband of each symbol period, as follows:

$$\underline{x}_{miso,ss}(n,k) = \underline{v}_{pm}(n,k) \cdot s(n,k). \qquad \text{Eq (8)}$$

The received symbols at the receiving entity may be expressed as:

$$\begin{aligned} r_{ss}(n,k) &= \underline{h}(k) \cdot \underline{x}_{miso,ss}(n,k) + z(n,k) \qquad \text{Eq (9)} \\ &= \underline{h}(k) \cdot \underline{v}_{pm}(n,k) \cdot s(n,k) + z(n,k) \\ &= h_{eff,ss}(n,k) \cdot s(n,k) + z(n,k). \end{aligned}$$

The effective SISO channel response $h_{eff,ss}(n,k)$ for each subband of each symbol period is determined by the actual MISO channel response $\underline{h}(k)$ for that subband and the steering vector $\underline{v}(n,k)$ used for the subband and symbol period. The effective SISO channel response $h_{eff,ss}(n,k)$ for each subband k varies across the PDU if different steering vectors $\underline{v}_{pm}(n,k)$ are used across the PDU.

The recipient receiving entity has knowledge of the steering vectors used by the transmitting entity and is able to perform the complementary spatial despreading to recover the transmitted PDU. The recipient receiving entity may obtain this information in various manners, as described below. The other receiving entities do not have knowledge of the steering vectors, and the PDU transmission appears spatially random to these entities. The likelihood of correctly recovering the PDU is thus greatly diminished for these receiving entities.

The recipient receiving entity receives the transmitted PDU and uses the preamble for channel estimation. For each subband, the recipient receiving entity can derive an estimate of the actual MISO channel response (instead of the effective SISO channel response) for each transmit antenna, or $\hat{h}_j(k)$ for $j=1 \ldots N_T$, based on the preamble. For simplicity, channel estimation for a case with two transmit antennas is described below.

Figure 3:
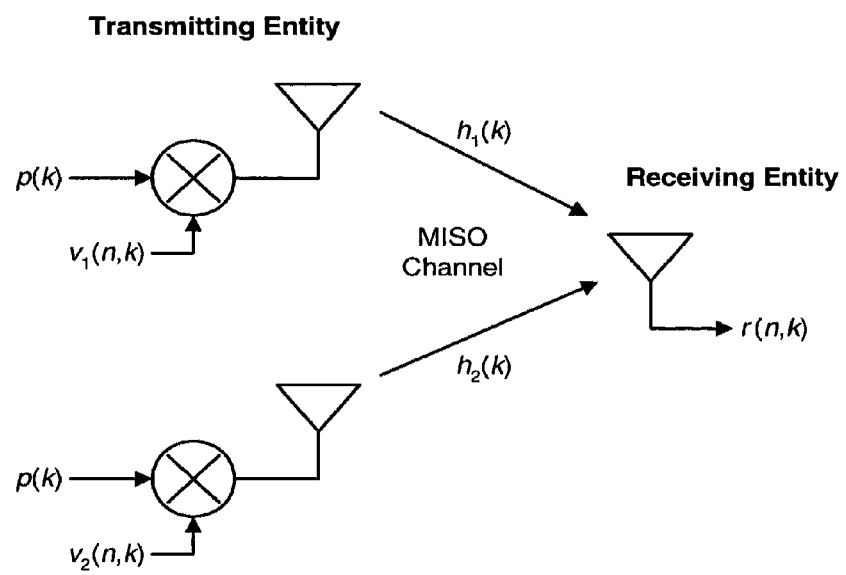
FIG. 3 shows pilot transmission from a dual-antenna transmitting entity to a single-antenna receiving entity.

FIG. 3 shows a model for pilot transmission on one subband k from a two-antenna transmitting entity to a single-antenna receiving entity. A pilot symbol p(k) is spatially processed with two elements $v_1(n,k)$ and $v_2(n,k)$ of a steering vector $\underline{v}_{pm}(n,k)$ to obtain two transmit symbols, which are then sent from the two transmit antennas. The two transmit symbols observe channel responses of $h_1(k)$ and $h_2(k)$, which are assumed to be constant across the PDU.

If the pilot symbol p(k) is transmitted in two symbol periods using two sets of steering vectors, $\underline{v}_{pm}(1,k)$ and $\underline{v}_{pm}(2,k)$, then the received pilot symbols at the receiving entity may be expressed as:

$$r(1,k) = h_1(k) \cdot v_1(1,k) \cdot p(k) + h_2(k) \cdot v_2(1,k) \cdot p(k) + z(1,k), \text{ and}$$

$$r(2,k) = h_1(k) \cdot v_1(2,k) \cdot p(k) + h_2(k) \cdot v_2(2,k) \cdot p(k) + z(2,k),$$

which may be expressed in matrix form as:

$$\underline{r}_p(k) = \underline{V}_p(k) \cdot \underline{h}^T(k) \cdot p(k) + \underline{z}(k), \qquad \text{Eq (10)}$$

where $\underline{r}_p(k) = [r_p(1,k) \ r_p(2,k)]^T$ is a vector with two received pilot symbols for subband k, where "T" denotes the transpose;

$\underline{V}_p(k)$ is a matrix with the two steering vectors $\underline{v}_{pm}(1,k) = [v_1(1,k) \ v_2(1,k)]^T$ and $\underline{v}_{pm}(2,k) = [v_1(2,k) \ v_2(2,k)]^T$ used for subband k;

$\underline{h}(k) = [h_1(k) \ h_2(k)]$ is a channel response row vector for subband k; and $\underline{z}(k) = [z(1,k) \ z(2,k)]^T$ is a noise vector for subband k.

The receiving entity may derive an estimate of the MISO channel response, $\hat{\underline{h}}(k)$, as follows:

$$\hat{\underline{h}}(k) = \underline{V}_p^{-1}(k) \cdot \underline{r}_p(k) \cdot p^*(k). \qquad \text{Eq (11)}$$

The recipient receiving entity can compute $\underline{V}_p^{-1}(k)$ since it knows all of the elements of $\underline{V}_p(k)$. The other receiving entities do not know $\underline{V}_p(k)$, cannot compute for $\underline{V}_p^{-1}(k)$, and cannot derive a sufficiently accurate estimate of $\hat{\underline{h}}(k)$.

The description above is for the simple case with two transmit antennas. In general, the number of transmit antennas determines the number of OFDM symbols for the pilot (the length of the pilot transmission) and the size of $\underline{V}_p(k)$. In particular, pilot symbols are transmitted for a minimum of $N_T$ symbol periods, and the matrix $\underline{V}_p(k)$ is typically of dimension $N_T \times N_T$.

The recipient receiving entity can thereafter derive an estimate of the effective SISO channel response, $\hat{h}_{eff,ss}(n,k)$, for each subsequent OFDM symbol in the PDU, as follows:

$$\hat{h}_{eff,ss}(n,k) = \hat{\underline{h}}(k) \cdot \underline{v}_{pm}(n,k). \qquad \text{Eq (12)}$$

The steering vector $\underline{v}_{pm}(n,k)$ may change from symbol period to symbol period for each subband. However, the recipient receiving entity knows the steering vector used for each subband and each symbol period. The receiving entity uses the effective SISO channel response estimate, $\hat{h}_{eff,ss}(n,k)$ for each subband of each symbol period to perform detection on the received symbol for that subband and symbol period, e.g., as shown in equation (5), where $\hat{h}_{eff,ss}(n,k)$ substitutes for $\hat{h}_{eff,sm}(k)$ and varies across the PDU.

The transmitting entity may also transmit the pilot "in the clear" without any spatial processing, but multiplying the pilot symbols for each transmit antenna with a different orthogonal sequence (e.g., a Walsh sequence) of length $N_T$ or an integer multiple of $N_T$. In this case, the receiving entity can estimate the MISO channel response $\underline{h}(k)$ directly by multiplying the received pilot symbols with each orthogonal sequence used for pilot transmission and integrating over the length of the sequence, as is known in the art. Alternatively, the transmitting entity may transmit the pilot using one steering vector $v_{pm}(1,k)$, and the receiving entity can estimate the effective MISO channel response as: $\hat{h}_{eff}(1, k)=\hat{h}(k) \cdot v_{pm}(1,k)$. The transmitting entity may thereafter transmit data using another steering vector $v_{pm}(2, k)$, and the receiving entity can then estimate the effective MISO channel response for the data as: $\hat{h}_{eff}(2, k)=\hat{h}_{eff,1}(k) \cdot v_{pm}^{H}(1,k) \cdot v_{pm}(2, k)$. The pilot transmission and channel estimation may thus be performed in various manners for spatial spreading.

The transmitting entity can perform spatial spreading on both the preamble and the signaling/data portion of the PDU. The transmitting entity can also perform spatial spreading on just the preamble, or just the signaling/data portion. In any case, the spatial spreading is such that the channel estimate obtained based on the preamble is not accurate or valid for the signaling/data portion. Improved performance may be achieved by performing spatial spreading on at least the signaling/data portion of the PDU so that this portion appears spatially random to the other receiving entities without knowledge of the steering vectors.

For spatial spreading, the recipient receiving entity knows that multiple antennas are used for data transmission and further knows the steering vector used for each subband in each symbol period. The spatial despreading is essentially achieved by using the proper steering vectors to derive the effective SISO channel response estimates, which are then used for data detection. The recipient receiving entity also enjoys the benefits of transmit diversity since different steering vectors are used across the PDU. The other receiving entities do not know the steering vectors used by the transmitting entity. Thus, their MISO channel response estimates are not valid for the signaling/data portion and, when used for data detection, provide degraded or corrupted detected symbols. Consequently, the likelihood of recovering the transmitted PDU may be substantially impacted for these other receiving entities. Since the receiving entity need to perform special processing for channel estimation and detection for spatial spreading, legacy receiving entities, which are designed for SISO operation only, also cannot recover a spatially spread data transmission.

Spatial spreading may also be performed for the steered mode and the PRTS mode by rotating the phase of each data symbol in a pseudo-random manner that is known by both the transmitting and receiving entities.

Figure 4:
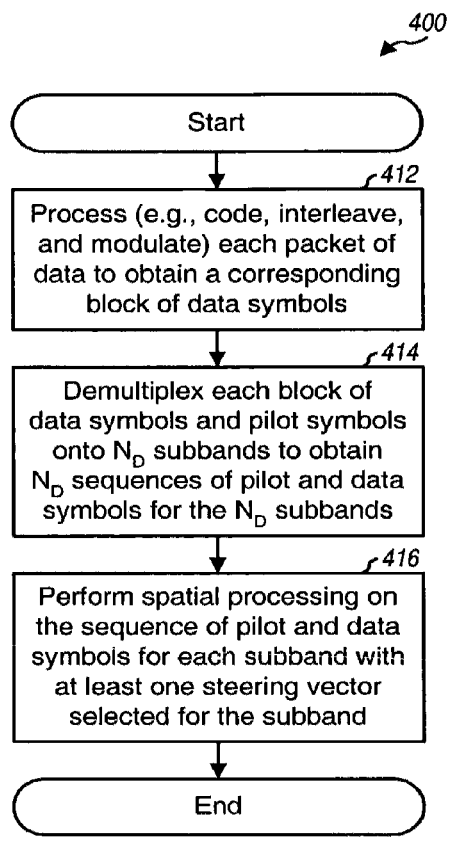
FIG. 4 shows a process for transmitting data using the steered or PRTS mode.

FIG. 4 shows a flow diagram of a process 400 for transmitting data from a transmitting entity to a receiving entity using the steered or PRTS mode. Each PDU of data is processed (e.g., coded, interleaved, and symbol mapped) to obtain a corresponding block of data symbols (block 412). The block of data symbols and pilot symbols are demultiplexed onto $N_D$ data subbands to obtain $N_D$ sequences of pilot and data symbols for the $N_D$ data subbands (block 414). Spatial processing is then performed on the sequence of pilot and data symbols for each data subband with at least one steering vector selected for the subband (block 416).

For the steered mode, one steering vector is used for each data subband, and the spatial processing with this steering vector steers the transmission toward the receiving entity. For transmit diversity in the PRTS mode, one pseudo-random steering vector is used for each data subband, and the receiving entity does not need to have knowledge of the steering vector. For spatial spreading in the PRTS mode, at least one pseudo-random steering vector is used for each data subband, where different steering is applied to the preamble and the signaling/data portion, and only the transmitting and receiving entities have knowledge of the steering vector(s). For the PRTS mode, the spatial processing with the pseudo-random steering vectors randomizes the $N_D$ effective SISO channels observed by the $N_D$ sequences of pilot and data symbols sent on the $N_D$ subbands.

The receiving entity may not be able to properly process a data transmission sent using the PRTS mode. This may be the case, for example, if the receiving entity assumes that the channel response is somewhat correlated across the subbands and uses some form of interpolation across the subbands for channel estimation. In this case, the transmitting entity can transmit using a "clear" mode without any spatial processing. The transmitting entity may also define and/or select the steering vectors in a manner to facilitate channel estimation for such a receiving entity. For example, the transmitting entity may use the same steering vector for each set of $N_X$ subbands, where $N_X > 1$. As another example, the steering vectors may be defined to be correlated (e.g., to be rotated versions of one another) across the subbands.

D. Multi-Mode Operation

The transmitting entity may also transmit data to the receiving entity using both the steered and PRTS modes. The transmitting entity can use the PRTS mode when the channel response is not known and switch to the steered mode once the channel response is known. For a TDD system, the downlink and uplink responses may be assumed to be reciprocal of one another. That is, if $\underline{h}(k)$ represents the channel response row vector from the transmitting entity to the receiving entity, then a reciprocal channel implies that the channel response from the receiving entity to the transmitting entity is given by $\underline{h}^T(k)$. The transmitting entity can estimate the channel response for one link (e.g., downlink) based on a pilot transmission sent by the receiving entity on the other link (e.g., uplink).

Figure 5:
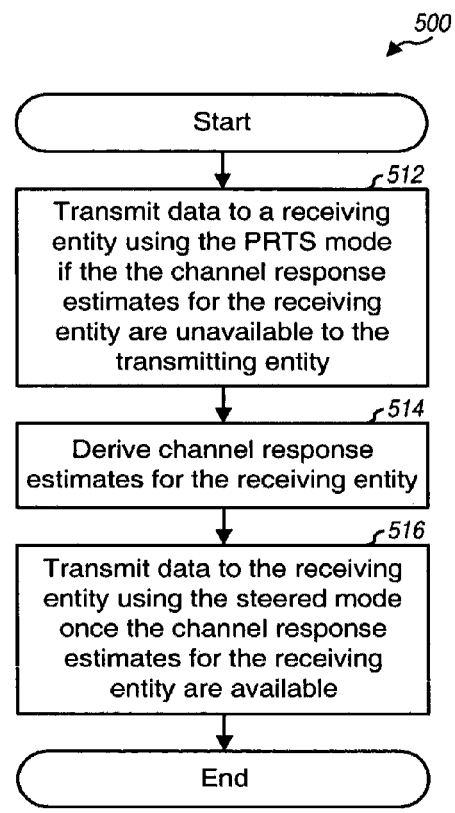
FIG. 5 shows a process for transmitting data using both modes.

FIG. 5 shows a flow diagram of a process 500 for transmitting data from a transmitting entity to a receiving entity using both the steered and PRTS modes. Initially, the transmitting entity transmits data to the receiving entity using the PRTS mode since it does not have channel response estimates for the receiving entity (block 512). The transmitting entity derives channel response estimates for the link between the transmitting and receiving entities (block 514). For example, the transmitting entity can (1) estimate the channel response for a first link (e.g., the uplink) based on a pilot sent by the receiving entity and (2) derive channel response estimates for a second link (e.g., the downlink) based on (e.g., as a reciprocal of) the channel response estimates for the first link. The transmitting entity thereafter transmits data to the receiving entity using the steered mode, with steering vectors derived from the channel response estimates for the second link, once the channel response estimates for the receiving entity are available (block 516).

The transmitting entity can go back and forth between the steered and PRTS modes depending on whether or not channel response estimates are available. The receiving entity performs the same processing for channel estimation and detection for both modes and does not need to be aware of which mode is being used by the transmitting entity for any given PDU. Better performance can typically be achieved with the steered mode, and the transmitting entity may be able to use a higher rate for the steered mode. In any case, the transmitting entity can signal the rate used for each PDU in the signaling portion of the PDU. The receiving entity would then process each PDU based on the channel estimates obtained for that PDU and in accordance with the indicated rate.

2. MIMO Transmission

In system 100, a MIMO channel exists between a multi-antenna transmitting entity and a multi-antenna receiving entity. For an OFDM-based system, the MIMO channel formed by the $N_T$ antennas at the transmitting entity and the $N_R$ antenna at the receiving entity may be characterized by a set of $N_F$ channel response matrices, each of dimension $N_R \times N_T$, which may be expressed as:

$$\underline{H}(k) = \begin{bmatrix} h_{1,1}(k) & h_{1,2}(k) & \ldots & h_{1,N_T}(k) \\ h_{2,1}(k) & h_{2,2}(k) & \ldots & h_{2,N_T}(k) \\ \vdots & \vdots & \ddots & \vdots \\ h_{N_R,1}(k) & h_{N_R,2}(k) & \ldots & h_{N_R,N_T}(k) \end{bmatrix}, \quad \text{Eq (13)}$$

for $k \in K$, where entry $h_{i,j}(k)$, for $i=1 \ldots N_R$ and $j=1 \ldots N_T$, denotes the coupling between transmit antenna j and receive antenna i for subband k. For simplicity, the MIMO channel response $\underline{H}(k)$ is assumed to be constant over each PDU.

The channel response matrix $\underline{H}(k)$ for each subband may be decomposed into $N_S$ spatial channels, where $N_S \leq \min\{N_T, N_R\}$. The $N_S$ spatial channels may be used to transmit data in a manner to achieve greater reliability and/or higher overall throughput. For example, $N_S$ data symbols may be transmitted simultaneously from the $N_T$ transmit antennas in each symbol period to achieve higher throughput. Alternatively, a single data symbol may be transmitted from the $N_T$ transmit antennas in each symbol period to achieve greater reliability. For simplicity, the following description assumes that $N_S = N_T \leq N_R$.

The transmitting entity may transmit data to the receiving entity using the steered or PRTS mode. In the steered mode for MIMO, the transmitting entity performs spatial processing to transmit data symbols on the "eigenmodes" of the MIMO channel, as described below. In the PRTS mode, the transmitting entity performs spatial processing such that the data symbols observe random effective MIMO channels. The steered and PRTS modes use different steering matrices and require different spatial processing by the receiving entity. The PRTS mode may also be used for transmit diversity and spatial spreading.

A. Steered Mode for MIMO

For the steered mode for MIMO, the transmitting entity derives steering matrices $\underline{V}_{sm}(k)$ by performing singular value decomposition of the channel response matrix $\underline{H}(k)$ for each subband, as follows:

$$\underline{H}(k) = \underline{U}(k)\underline{\Sigma}(k)\underline{V}_{sm}^H(k), \qquad \text{Eq (14)}$$

where
- $\underline{U}(k)$ is an $N_R \times N_R$ unitary matrix of left eigenvectors of $\underline{H}(k)$;
- $\underline{\Sigma}(k)$ is an $N_R \times N_T$ diagonal matrix of singular values of $\underline{H}(k)$; and
- $\underline{V}_{sm}(k)$ is an $N_T \times N_T$ unitary matrix of right eigenvectors of $\underline{H}(k)$.

A unitary matrix M is characterized by the property $M^H M = I$, where I is the identity matrix. The columns of a unitary matrix are orthogonal to one another. Since the channel response $\underline{H}(k)$ is assumed to be constant across a PDU, the steering matrices $\underline{V}_{sm}(k)$ are also constant across the PDU and is a function of only subband k.

The transmitting entity performs spatial processing for each subband as follows:

$$\underline{x}_{mimo,sm}(n,k) = \underline{V}_{sm}(k) \cdot \underline{s}(n,k), \qquad \text{Eq (15)}$$

where $\underline{s}(n,k)$ is an $N_T \times 1$ vector with $N_T$ data symbols to be sent on subband k in symbol period n; and
$\underline{x}_{mimo,sm}(n,k)$ is an $N_T \times 1$ vector with $N_T$ transmit symbols to be sent from the $N_T$ transmit antennas on subband k in symbol period n.

The spatial processing with the steering matrices $\underline{V}_{sm}(k)$ results in the $N_T$ data symbols in s(n,k) being transmitted on $N_T$ eigenmodes of the MIMO channel, which may be viewed as orthogonal spatial channels.

The received symbols at the receiving entity may be expressed as:

$$\underline{r}_{sm}(n,k) = \underline{H}(k) \cdot \underline{x}_{mimo,sm}(n,k) + \underline{z}(n,k) = \underline{H}(k) \cdot \underline{V}_{sm}(k) \cdot \underline{s}(n,k) + \underline{z}(n,k), \qquad \text{Eq (16)}$$

where
$\underline{r}_{sm}(n,k)$ is an $N_R \times 1$ vector with $N_R$ received symbols for subband k in symbol period n; and
$\underline{z}(n,k)$ is a noise vector for subband k in symbol period n. For simplicity, the noise is assumed to be additive white Gaussian noise (AWGN) with a zero mean vector and a covariance matrix of $\Lambda = \sigma^2 \cdot I$, where $\sigma^2$ is the variance of the noise observed by the receiving entity.

The receiving entity performs spatial processing for the steered mode as follows:

$$\hat{\underline{s}}_{sm}(n,k) = \underline{\Sigma}^{-1}(n,k) \cdot \underline{U}^H(n,k) \cdot \underline{r}_{sm}(n,k) = \underline{s}(n,k) + \underline{z}'(n,k), \qquad \text{Eq (17)}$$

where $\hat{\underline{s}}(n,k)$ is a vector with $N_T$ detected symbols for the steered mode, which is an estimate of $\underline{s}(n,k)$, and $\underline{z}'(n,k)$ is a post-detection noise vector.

B. Steered Mode with Spatial Spreading

Spatial spreading may also be performed in combination with the steered mode. In this case, the transmitting entity first performs spatial processing on the data symbol vector s(n,k) for spatial spreading and then performs spatial processing on the resultant spread symbols for the steered mode. For spatial spreading, the transmitting entity uses different steering matrices across the pseudo-random steered portion of a PDU for each subband k. It is desirable to use as many different steering matrices as possible across both subbands and symbol periods to achieve a higher degree of spatial spreading. For example, a different set of steering matrices $\{\underline{V}_{pm}(n,k)\}$ may be used for each symbol period across the PDU. At a minimum, one steering matrix set is used for the preamble and another steering matrix set is used for the remainder of the PDU, where one steering matrix set may include identity matrices.

The transmitting entity performs spatial processing for each subband of each symbol period, as follows:

$$\underline{x}_{mimo,sm,ss}(n,k) = \underline{V}_{sm}(k) \cdot \underline{V}_{pm}(n,k) \cdot \underline{s}(n,k), \qquad \text{Eq (18)}$$

where $\underline{V}_{pm}(n,k)$ is an $N_T \times N_T$ pseudo-random steering matrix for subband k in symbol period n. As shown in equation (18), the transmitting entity performs spatial spreading with the pseudo-random steering matrix $\{\underline{V}_{pm}(n,k)\}$ first, followed by spatial processing for the steered mode with the steering matrix $\{\underline{V}_{sm}(k)\}$ derived from the MIMO channel response matrix $\underline{H}(k)$. The spread symbols (instead of the data symbols) are thus transmitted on the eigenmodes of the MIMO channel.

The received symbols at the receiving entity may be expressed as:

$$r_{sm,ss}(n, k) = \underline{H}(k) \cdot \underline{x}_{miso,sm,ss}(n, k) + z(n, k) \quad \text{Eq (19)}$$
$$= \underline{H}(k) \cdot \underline{V}_{sm}(k) \cdot \underline{V}_{pm}(n, k) \cdot \underline{s}(n, k) + z(n, k).$$

The receiving entity performs spatial processing for the steered mode and spatial despreading as follows:

$$\underline{s}_{sm,ss}(n,k) = \underline{V}_{pm}^H(n,k) \cdot \underline{\Sigma}^{-1}(n,k) \cdot \underline{U}^H(n,k) \cdot r_{sm,ss}(n,k) =$$
$$\underline{s}(n,k) + \underline{z}'(n,k), \quad \text{Eq (20)}$$

As shown in equation (20), the receiving entity can recover the transmitted data symbols by first performing the receiver spatial processing for the steered mode followed by spatial despreading with the pseudo-random steering matrix { $\underline{V}_{pm}(n,k)$ }. For the steered mode with spatial spreading, the effective MIMO channel observed by the data symbols for each subband includes both matrices $\underline{V}_{sm}(k)$ and $\underline{V}_{pm}(n,k)$ used by the transmitting entity.

C. PRTS Mode for Transmit Diversity

For the PRTS mode for MIMO, the transmitting entity uses pseudo-random steering matrices for spatial processing. These steering matrices are derived to have certain desirable properties, as described below.

To achieve transmit diversity with the PRTS mode, the transmitting entity uses different steering matrices across the subbands but the same steering matrix across the pseudo-random steered portion of a PDU for each subband k. It is desirable to use as many different steering matrices as possible across the subbands to achieve greater transmit diversity.

The transmitting entity performs spatial processing for each subband as follows:

$$\underline{x}_{mimo,td}(n,k) = \underline{V}_{pm}(k) \cdot \underline{s}(n,k), \quad \text{Eq (21)}$$

where $\underline{V}_{pm}(k)$ is an $N_T \times N_T$ steering matrix for subband k in symbol period n; and $\underline{x}_{mimo,td}(n,k)$ is an $N_T \times 1$ vector with $N_T$ transmit symbols to be sent from the $N_T$ transmit antennas on subband k in symbol period n.

One set of steering matrices $\{\underline{V}_{pm}(k)\}$ is used across all OFDM symbols in the PDU.

The received symbols at the receiving entity may be expressed as:

$$r_{td}(n, k) = \underline{H}(k) \cdot \underline{x}_{miso,td}(n, k) + z(n, k) \quad \text{Eq (22)}$$
$$= \underline{H}(k) \cdot \underline{V}_{pm}(k) \cdot \underline{s}(n, k) + z(n, k)$$
$$= \underline{H}_{eff,td}(k) \cdot \underline{s}(n, k) + z(n, k),$$

where $\underline{r}_{td}(n,k)$ is a vector of received symbols for the PRTS mode; and $\underline{H}_{eff,td}(k)$ is an $N_T \times N_T$ effective MIMO channel response matrix for subband k in symbol period n, which is $\underline{H}_{eff,td}(k) = \underline{H}(k) \cdot \underline{V}_{pm}(k)$.

The spatial processing with the pseudo-random steering matrix $\underline{V}_{pm}(k)$ results in the data symbols in $s(n,k)$ observing an effective MIMO channel response $\underline{H}_{eff,td}(k)$, which includes the actual channel response $\underline{H}(k)$ and the steering matrix $\underline{V}_{pm}(k)$. The receiving entity can estimate the effective MIMO channel response $\underline{H}_{eff,td}(k)$, for example, based on pilot symbols received from the transmitting entity. The receiving entity can then perform spatial processing on the received symbols in $r_{td}(n,k)$ with the effective MIMO channel response estimate, $\hat{\underline{H}}_{eff,td}(k)$ to obtain detected symbols $\hat{s}_{td}(n,k)$. The effective MIMO channel response estimate, $\hat{\underline{H}}_{eff,td}(k)$, for each subband k is constant across the PDU because (1) the actual MIMO channel response $\underline{H}(k)$ is assumed to be constant across the PDU and (2) the same steering matrix $\underline{V}_{pm}(k)$ is used across the PDU.

The receiving entity can derive the detected symbols using various receiver processing techniques including (1) a channel correlation matrix inversion (CCMI) technique, which is also commonly referred to as a zero-forcing technique, and (2) a minimum mean square error (MMSE) technique. Table 1 summarizes the spatial processing at the receiving entity for the CCMI and MMSE techniques. In Table 1, $\underline{M}_{ccmi,td}(k)$ is a spatial filter matrix for the CCMI technique, $\underline{M}_{mmse,td}(k)$ is a spatial filter matrix for the MMSE technique, and $\underline{D}_{mmse,td}(k)$ is a diagonal matrix for the MMSE technique (which contains the diagonal elements of $\underline{M}_{mmse,td}(k)\hat{\underline{H}}_{eff,td}(k)$).

TABLE 1

| Technique | Receiver Spatial Processing | |
|---|---|---|
| CCMI | $\hat{s}_{ccmi, td}(n, k) = \underline{M}_{ccmi, td}(k) \cdot r_{td}(n, k)$ | Spatial Processing |
|  | $\underline{M}_{ccmi, td}(k) = [\hat{\underline{H}}_{eff, td}^H(k)\hat{\underline{H}}_{eff, td}(k)]^{-1}\hat{\underline{H}}_{eff, td}^H(k)$ | Spatial Filter Matrix |
| MMSE | $\hat{s}_{mmse, td}(n, k) = \underline{D}_{mmse, td}^{-1}(k) \cdot \underline{M}_{mmse, td}(k) \cdot r_{td}(n, k)$ | Spatial Processing |
|  | $\underline{M}_{mmse, td}(k) = \hat{\underline{H}}_{eff, td}^H(k) \cdot [\hat{\underline{H}}_{eff, td}(k) \cdot \hat{\underline{H}}_{eff, td}^H(k) + \sigma^2 \cdot I]^{-1}$ | Spatial Filter Matrix |
|  | $\underline{D}_{mmse, td}(k) = \text{diag}[\underline{M}_{mmse, td}(k)\underline{H}_{eff, td}(k)]$ | |

As shown in Table 1, for transmit diversity, the spatial filter matrices $\underline{M}_{ccmi,td}(k)$ and $\underline{M}_{mmse,td}(k)$ for each subband k are constant across the PDU because the effective MIMO channel response estimate, $\hat{\underline{H}}_{eff,td}(k)$ is constant across the PDU. For transmit diversity, the receiving entity does not need to know the steering matrix used for each subband. The receiving entity can nevertheless enjoy the benefits of transmit diversity since different steering matrices are used across the subbands and different effective MIMO channels are formed for these subbands.

D. PRTS Mode for Spatial Spreading

For spatial spreading in the PRTS mode, the transmitting entity uses different steering matrices across the pseudo-random steered portion of a PDU for each subband k. The pseudo-random steering matrices for spatial spreading may be selected as described above for the steered mode.

The transmitting entity performs spatial processing for each subband of each symbol period, as follows:

$$\underline{x}_{mimo,ss}(n,k) = \underline{V}_{pm}(n,k) \cdot \underline{s}(n,k). \quad \text{Eq (23)}$$

The received symbols at the receiving entity may be expressed as:

$$\underline{r}_{ss}(n,k) = \underline{H}(k) \cdot \underline{x}_{miso,ss}(n,k) + \underline{z}(n,k) \quad \text{Eq (24)}$$
$$= \underline{H}(k) \cdot \underline{V}_{pm}(n,k) \cdot \underline{s}(n,k) + \underline{z}(n,k)$$
$$= \underline{H}_{eff,ss}(n,k) \cdot \underline{s}(n,k) + \underline{z}(n,k).$$

The effective MIMO channel response $\underline{H}_{eff,ss}(n,k)$ for each subband of each symbol period is determined by the actual channel response $\underline{H}(k)$ for the subband and the steering matrix $\underline{V}_{pm}(n,k)$ used for that subband and symbol period. The effective MIMO channel response $\underline{H}_{eff,ss}(n,k)$ for each subband k varies across the PDU because different steering matrices $\underline{V}_{pm}(n,k)$ are used across the PDU.

The recipient receiving entity receives the transmitted PDU and uses the preamble for channel estimation. For each subband, the recipient receiving entity can derive an estimate of the actual MIMO channel response $\underline{H}(k)$ (instead of the effective MIMO channel response) based on the preamble. The recipient receiving entity can thereafter derive an estimate of the effective MIMO channel response matrix, $\hat{\underline{H}}_{eff,ss}(n,k)$, for each subband of each symbol period, as follows:

$$\hat{\underline{H}}_{eff,ss}(n,k) = \hat{\underline{H}}(k) \cdot \underline{V}(n,k). \quad \text{Eq (25)}$$

The steering matrix $\underline{V}_{pm}(n,k)$ may change from symbol period to symbol period for each subband. The receiving entity uses the effective MIMO channel response estimate, $\hat{\underline{H}}_{eff,ss}(n,k)$, for each subband of each symbol period to perform spatial processing on the receive symbols for that subband and symbol period, e.g., using the CCMI or MMSE technique. For example, the matrix $\hat{\underline{H}}_{eff,ss}(n,k)$ may be used to derive the spatial filter matrix for the CCMI or MMSE technique, as shown in Table 1, where $\hat{\underline{H}}_{eff,ss}(n,k)$ substitutes for $\hat{\underline{H}}_{eff,td}(k)$. However, because the matrix $\hat{\underline{H}}_{eff,ss}(n,k)$ varies across the PDU, the spatial filter matrix also varies across the PDU.

For spatial spreading, the recipient receiving entity has knowledge of the steering matrix used by the transmitting entity for each subband in each symbol period and is able to perform the complementary spatial despreading to recover the transmitted PDU. The spatial despreading is achieved by using the proper steering matrices to derive the effective MIMO channel response estimates, which are then used for spatial processing. The other receiving entities do not have knowledge of the steering matrices and the PDU transmission appears spatially random to these entities. As a result, these other receiving entities have a low likelihood of recovering the transmitted PDU.

E. Multi-Mode Operation

The transmitting entity may also transmit data to the receiving entity using both the PRTS and steered modes. The transmitting entity can use the PRTS mode when the channel response is not available and switch to the steered mode once the channel response is available.

3. Steering Vector and Matrix Generation

The steering vectors and matrices used for the PRTS mode may be generated in various manners. Some exemplary schemes for generating these steering vectors/matrices are described below. The steering vectors/matrices may be pre-computed and stored at the transmitting and receiving entities and thereafter retrieved for use as they are needed. Alternatively, these steering vectors/matrices may be computed in real time as they are needed. In the following description, a set of L steering vectors or matrices is generated and selected for use for the PRTS mode.

A. Steering Vector Generation

The steering vectors used for the PRTS mode should have the following properties in order to achieve good performance. Strict adherence to these properties is not necessary. First, each steering vector should have unit energy so that the transmit power used for the data symbols is not varied by the pseudo-random transmit steering. Second, the $N_T$ elements of each steering vector may be defined to have equal magnitude so that the full transmit power of each antenna can be used. Third, the different steering vectors should be reasonably uncorrelated so that the correlation between any two steering vectors in the set is zero or a low value. This condition may be expressed as:

$$c(ij) = \underline{v}_{pm}^H(i) \cdot \underline{v}_{pm}(j) \approx 0, \text{ for } i=1 \ldots L, j=1 \ldots L, \text{ and } i \neq j, \quad \text{Eq (26)}$$

where $c(ij)$ is the correlation between steering vectors $\underline{v}_{pm}(i)$ and $\underline{v}_{pm}(j)$.

The set of L steering vectors $\{\underline{v}_{pm}(i)\}$ may be generated using various schemes. In a first scheme, the L steering vectors are generated based on $N_T \times N_T$ matrices G of independent identically distributed (IID) complex Gaussian random variables, each having zero mean and unit variance. A correlation matrix of each matrix G is computed as $R = G^H \cdot G$ and decomposed as $R = E \cdot D \cdot E^H$ to obtain a unitary matrix E. Each column of E may be used as a steering vector $\underline{v}_{pm}(i)$ if it meets the low correlation criterion with each of the steering vectors already in the set.

In a second scheme, the L steering vectors are generated by successively rotating an initial unitary steering vector $\underline{v}_{pm}(1)$ as follows:

$$\underline{v}_{pm}(i+1) = e^{j2\pi i/L} \cdot \underline{v}_{pm}(i), \text{ for } i=2 \ldots L, \text{ where } L \geq N_T. \quad \text{Eq (27)}$$

In a third scheme, the L steering vectors are generated such that the elements of these vectors have the same magnitude but different phases. For a given steering vector $\underline{v}_{pm}(i) = [v_1(i) \, v_2(i) \, v_{N_T}(i)]$, which may be generated in any manner, a normalized steering vector $\tilde{\underline{v}}_{pm}(i)$ may be formed as:

$$\tilde{\underline{v}}_{pm}(i) = [A e^{j\theta_1(i)} A e^{j\theta_2(i)} \ldots A e^{j\theta_1(i)}], \quad \text{Eq (28)}$$

where A is a constant (e.g., $$A = 1/\sqrt{N_T})$$

and $$\theta_j(i) = \angle v_j(i) = \tan^{-1}\left(\frac{\text{Im}\{v_j(i)\}}{\text{Re}\{v_j(i)\}}\right)$$

is the phase of the j-th element of $\underline{v}_{pm}(i)$. The normalized steering vector $\tilde{\underline{v}}_{pm}(i)$ allows the full transmit power available for each antenna to be used for transmission.

Other schemes may also be used to generate the set of L steering vectors, and this is within the scope of the invention.

B. Steering Matrix Generation

The steering matrices used for the PRTS mode should have the following properties in order to achieve good performance. Strict adherence to these properties is not necessary. First, the steering matrices should be unitary matrices and satisfy the following condition:

$$\underline{V}_{pm}^H(i) \cdot \underline{V}_{pm}(i) = \underline{I}, \text{ for } i=1 \ldots L. \quad \text{Eq (29)}$$

Equation (29) indicates that each column of $\underline{V}_{pm}(i)$ should have unit energy and the Hermitian inner product of any two columns of $\underline{V}_{pm}(i)$ should be zero. This condition ensures that the $N_T$ data symbols sent simultaneously using the steering matrix $\underline{V}_{pm}(i)$ have the same power and are orthogonal to one another prior to transmission. Second, the correlation between any two steering matrices in the set should be zero or a low value. This condition may be expressed as:

$$\underline{C}(ij) = \underline{V}_{pm}^{H}(i) \cdot \underline{V}_{pm}(j) \approx \underline{0}, \text{ for } i=1\ldots L, j=1\ldots L, \text{ and } i \neq j, \qquad \text{Eq (30)}$$

where $\underline{C}(ij)$ is the correlation matrix for $\underline{V}_{pm}(i)$ and $\underline{V}_{pm}(j)$ and $\underline{0}$ is a matrix of all zeros. The L steering matrices may be generated such that the maximum energy of the correlation matrices for all possible pairs of steering matrices is minimized.

The set of L steering matrices $\{\underline{V}_{pm}(i)\}$ may be generated using various schemes. In a first scheme, the L steering matrices are generated based on matrices of random variables. A matrix G of random variables is initially generated, and a correlation matrix of G is computed and decomposed to obtain a unitary matrix $\underline{E}$, as described above. If low correlation exists between $\underline{E}$ and each of the steering matrices already generated, then $\underline{E}$ may be used as a steering matrix $\underline{V}_{pm}(i)$ and added to the set. The process is repeated until all L steering matrices are generated.

In a second scheme, the L steering matrices are generated by successively rotating an initial unitary matrix $\underline{V}(1)$ in an $N_T$-dimensional complex space, as follows:

$$\underline{V}_{pm}(i+1) = \underline{\Theta}^i \cdot \underline{V}_{pm}(1), \text{ for } i=1\ldots L-1, \qquad \text{Eq (31)}$$

where $\underline{\Theta}^i$ is an $N_T \times N_T$ diagonal unitary matrix with elements that are L-th roots of unity. The second scheme is described by B. M. Hochwald et al. in "Systematic Design of Unitary Space-Time Constellations," IEEE Transaction on Information Theory, Vol. 46, No. 6, September 2000.

Other schemes may also be used to generate the set of L steering matrices, and this is within the scope of the invention. In general, the steering matrices may be generated in a pseudo-random or deterministic manner.

C. Steering Vector/Matrix Selection

The L steering vectors/matrices in the set may be selected for use in various manners. A steering vector may be viewed as a degenerated steering matrix containing just one column. Thus, as used herein, a matrix may contain one or multiple columns.

In one embodiment, the steering matrices are selected from the set of L steering matrices in a deterministic manner. For example, the L steering matrices may be cycled through and selected in sequential order, starting with $\underline{V}(1)$, then $\underline{V}(2)$, and so on, and then $\underline{V}(L)$. In another embodiment, the steering matrices are selected from the set in a pseudo-random manner. For example, the steering matrix to use for each subband k may be selected based on a function $f(k)$ that pseudo-randomly selects one of the L steering matrices, or $\underline{V}(f(k))$. In yet another embodiment, the steering matrices are selected from the set in a "permutated" manner. For example, the L steering matrices may be cycled through and selected for use in sequential order. However, the starting steering matrix for each cycle may be selected in a pseudo-random manner, instead of always being the first steering matrix $\underline{V}(1)$. The L steering matrices may also be selected in other manners.

The steering matrix selection may also be dependent on the number of steering matrices (L) in the set and the number of subbands ($N_M$) to apply pseudo-random transmit steering, e.g., $N_M = N_D + N_P$. In general, L may be greater than, equal to, or less than $N_M$. If $L = N_M$, then a different steering matrix may be selected for each of the $N_M$ subbands. If $L < N_M$, then the steering matrices are reused for each symbol period. If $L > N_M$, then a subset of the steering matrices is used for each symbol period. For all cases, the $N_M$ steering matrices for the $N_M$ subbands may be selected in a deterministic, pseudo-random, or permutated manner, as described above.

For transmit diversity, $N_M$ steering matrices are selected for the $N_M$ subbands for each PDU. For spatial spreading, $N_M$ steering matrices may be selected for the $N_M$ subbands for each symbol period of the PDU. A different set of $N_M$ steering matrices may be selected for each symbol period, where the set may include a different permutation of the L steering matrices.

For spatial spreading for both MISO and MIMO, only the transmitting and receiving entities know the pseudo-random steering matrices used for spatial processing. This may be achieved in various manners. In one embodiment, steering matrices are pseudo-randomly selected from the set of L steering matrices based on an algorithm may be seeded with secure information (e.g., a key, a seed, an identifier, or a serial number) exchanged between the transmitting and receiving entities (e.g., via secure over-the-air signaling or by some other means). This results in the set of steering matrices being permutated in a manner known only to the transmitting and receiving entities. In another embodiment, the transmitting and receiving entities modify the common steering matrices known to all entities using a unique matrix $\underline{U}_u$ that is known only to the two entities. This operation may be expressed as: $\underline{V}_{pm,u}(i) = \underline{U}_u \cdot \underline{V}_{pm}(i)$ or $\underline{v}_{pm,u}(i) = \underline{U}_u \cdot \underline{v}_{pm}(i)$. The modified steering matrices are then used for spatial processing. In yet another embodiment, the transmitting and receiving entities permutate the columns of the common steering matrices in a manner known only to these two entities. In yet another embodiment, the transmitting and receiving entities generate the steering matrices as they are needed based on some secure information known only to these two entities. The pseudo-random steering matrices used for spatial spreading may be generated and/or selected in various other manners, and this is within the scope of the invention.

4. IEEE 802.11

The techniques described herein may be used for various OFDM systems, e.g., for systems that implement IEEE 802.11a and 802.11g. The OFDM structure for 802.11a/g partitions the overall system bandwidth into 64 orthogonal subbands (or $N_F = 64$), which are assigned indices of −32 to +31. Of these 64 subbands, 48 subbands (with indices of $\pm\{1, \ldots, 6, 8, \ldots, 20, 22, \ldots, 26\}$) are used for data transmission, four subbands (with indices of $\pm\{7, 21\}$) are used for pilot transmission, and the DC subband (with index of 0) and the remaining subbands are not used and serve as guard subbands. For IEEE 802.11a/g, each OFDM symbol is composed of a 64-chip transformed symbol and a 16-chip cyclic prefix. IEEE 802.11a/g uses a 20 MHz system bandwidth. Thus, each chip has a duration of 50 nsec, and each OFDM symbol has a duration of 4.0 μsec, which is one OFDM symbol period for this system. This OFDM structure is described in a document for IEEE Standard 802.11a entitled "Part 11: Wireless LAN Medium Access Control (MAC) and Physical Layer (PHY) Specifications: High-speed Physical Layer in the 5 GHz Band," September 1999, which is publicly available.

FIG. 6A shows a PDU format 600 defined by IEEE 802.11. Format 600 supports both the steered mode and the PRTS mode (for both transmit diversity and spatial spreading) for MISO transmission. At a physical (PHY) layer in the protocol stack for IEEE 802.11, data is processed as PHY sublayer service data units (PSDUs). Each PSDU 630 is coded and modulated separately based on a coding and modulation scheme selected for that PSDU. Each PSDU 630 further has a PLCP header 610 that includes six fields. A rate field 612 indicates the rate for the PSDU. A reserved field 614 includes one reserved bit. A length field 616 indicates the length of the PSDU in units of octets. A parity field 618 carries a 1-bit even parity for the three preceding fields. A tail field 620 carries six zeros used to flush out the encoder. A service field 622 includes seven null bits used to initialize a scrambler for the PSDU and nine reserved bits. A tail field 632 is appended at the end of PSDU 630 and carries six zeros used to flush out the encoder. A variable length pad field 634 carries a sufficient number of pad bits to make the PSDU fit an integer number of OFDM symbols.

Each PSDU 630 and its associated fields are transmitted in one PHY protocol data unit (PPDU) 640 that includes three sections. A preamble section 642 has a duration of four OFDM symbol periods and carries ten short training symbols 642a and two long training symbols 642b, which are used for AGC, timing acquisition, coarse and fine frequency acquisition, channel estimation, and other purposes by a receiving entity. The ten short training symbols are generated with 12 specific pilot symbols on 12 designated subbands and span two OFDM symbol periods. The two long training symbols are generated with 52 specific pilot symbols on 52 designated subbands and also span two OFDM symbol periods. A signal section 644 carries one OFDM symbol for the first five fields of the header. A data section 648 carries a variable number of OFDM symbols for the service field of the header, the PSDU, and the subsequent tail and pad fields. PPDU 640 may also be referred to as a packet or some other terminology.

FIG. 6B shows an exemplary PDU format 602 that supports both the steered and PRTS modes for both MISO and MIMO transmissions. A PPDU 650 for this format includes a preamble section 652, a signal section 654, a MIMO pilot section 656, and a data section 658. Preamble section 652 carries ten short training symbols 652a and two long training symbols 652b, similar to preamble section 642. Signal section 654 carries signaling for PPDU 650 and may be defined as shown in Table 2.

TABLE 2

| Field | Length (bits) | Description |
| --- | --- | --- |
| CCH Rate Indicator | 2 | Rate for control channel (CCH). |
| MIMO Pilot Length | 1 | Length of MIMO pilot section (e.g., 2 or 4 OFDM symbol periods). |
| MIMO Indicator | 1 | Indicates PLCP header of format 602. |
| QoS | 2 | Quality of service (video/voice) |
| Length Indicator | 10 | Length of data section (e.g., in multiples of the cyclic prefix length, or 800 nsec for IEEE 802.11). |
| Rate Vector | 16 | Rates used for spatial channels 1, 2, 3, 4. |
| Reserved | 2 | Reserved for future use. |
| CRC | 8 | CRC value for the PLCP header. |
| Tail | 6 | Six zeros to flush out the encoder. |

Table 2 shows an exemplary format for signal section 654 for four transmit antennas ($N_T$=4). Up to four spatial channels may be available for data transmission depending on the number of receive antennas. The rate for each spatial channel is indicated by the rate vector field. The receiving entity may determine and send back the maximum rates supported by the spatial channels. The transmitting entity may then select the rates for data transmission based on (e.g., less than or equal to) these maximum rates. Other formats with different fields may also be used for signal section 654.

MIMO pilot section 656 carries a MIMO pilot used by the receiving entity to estimate the MIMO channel. The MIMO pilot is a pilot transmitted from all $N_T$ transmit antennas (1) "in the clear" without any spatial processing, (2) with pseudo-random steering as shown in equation (21) or (23), or (3) on the eigenmodes of the MIMO channel as shown in equation (18). The transmit symbols for each transmit antenna for the MIMO pilot are further multiplied (or covered) with an $N_T$-chip orthogonal sequence (e.g., a 4-chip Walsh code) assigned to that transmit antenna. Data section 658 carries a variable number of OFDM symbols for the data, pad bits, and tail bits, similar to data section 648.

Pseudo-random transmit steering may be performed in various manners for formats 600 and 602. In an embodiment for the PRTS mode, pseudo-random transmit steering is applied across an entire PDU. In another embodiment for the PRTS mode, pseudo-random transmit steering is applied across a portion of a PDU. For example, pseudo-random transmit steering may be applied across the entire PDU except for the ten short training symbols for formats 600 and 602. Pseudo-random transmit steering on the ten short training symbols may adversely impact signal detection, AGC, timing acquisition, and coarse frequency acquisition, and is thus not applied on these symbols if such is the case. For transmit diversity, for each subband, the same pseudo-random steering vector/matrix is used across the pseudo-random steered portion of the PDU. For spatial spreading, for each subband, different vectors/matrices may be used across the pseudo-random steered portion of the PDU. At a minimum, different steering vectors/matrices are used for the preamble/pilot portion used for channel estimation (e.g., the two long training symbols) and the data section of the PDU. For format 600, different steering vectors may be used for the two long training symbols in the preamble section and the data section of PPDU 640, where the steering vector for one section may be all ones. For format 602, different steering matrices may be used for the MIMO pilot section and the data section of PPDU 650, where the steering matrix for one section may be the identity matrix.

The receiving entity typically processes each PPDU separately. The receiving entity can use (1) the short training symbols for AGC, diversity selection, timing acquisition, and coarse frequency acquisition, and (2) the long training symbols for fine frequency acquisition. The receiving entity can use the long training symbols for MISO channel estimation and the MIMO pilot for MIMO channel estimation. The receiving entity can derive the effective channel response estimates directly or indirectly from the preamble or MIMO pilot and use the channel estimates for detection or spatial processing, as described above.

5. System

Figure 7:
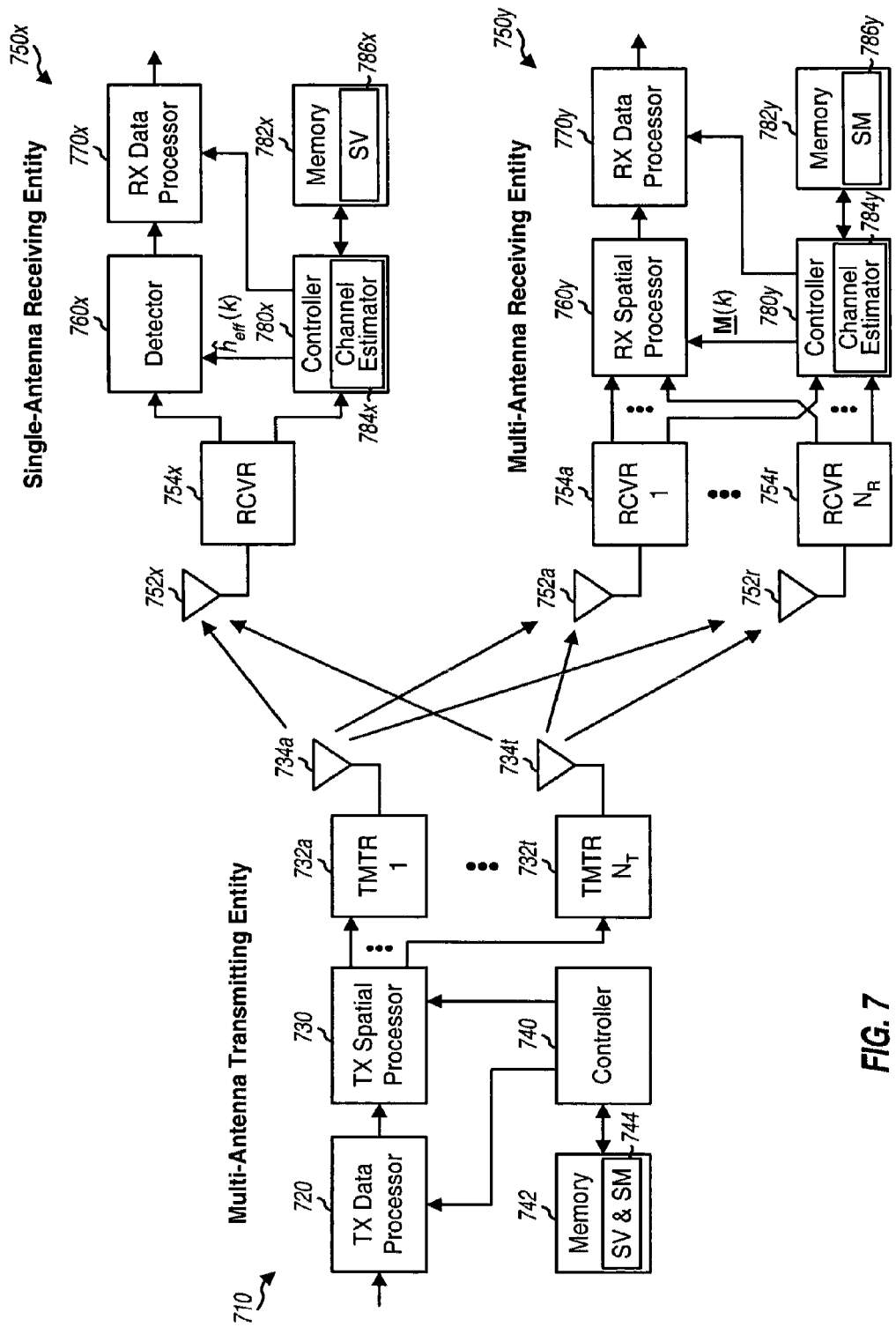
FIG. 7 shows a transmitting entity and two receiving entities.

FIG. 7 shows a block diagram of a multi-antenna transmitting entity 710, a single-antenna receiving entity 750x, and a multi-antenna receiving entity 750y in system 100. Transmitting entity 710 may be an access point or a multi-antenna user terminal Each receiving entity 750 may also be an access point or a user terminal.

At transmitting entity 710, a transmit (TX) data processor 720 processes (e.g., codes, interleaves, and symbol maps) each packet of data to obtain a corresponding block of data symbols. A TX spatial processor 730 receives and demultiplexes pilot and data symbols onto the proper subbands, performs spatial processing for the steered and/or PRTS mode, and provides $N_T$ streams of transmit symbols to $N_T$ transmitter units (TMTR) 732a through 732t. Each transmitter unit 732 processes its transmit symbol stream to generate a modulated signal. Transmitter units 732a through 732t provide $N_T$ modulated signals for transmission from $N_T$ antennas 734a through 734t, respectively.

At single-antenna receiving entity 750x, an antenna 752x receives the $N_T$ transmitted signals and provides a received signal to a receiver unit (RCVR) 754x. Receiver unit 754x performs processing complementary to that performed by transmitter units 732 and provides (1) received data symbols to a detector 760x and (2) received pilot symbols to a channel estimator 784x within a controller 780x. Channel estimator 784x derives channel response estimates for the effective SISO channels between transmitting entity 710 and receiving entity 750x for all data subbands. Detector 760x performs detection on the received data symbols for each subband based on the effective SISO channel response estimate for that subband and provides a stream of detected symbols for all subbands. A receive (RX) data processor 770x then processes (e.g., symbol demaps, deinterleaves, and decodes) the detected symbol stream and provides decoded data for each data packet.

At multi-antenna receiving entity 750y, $N_R$ antennas 752a through 752r receive the $N_T$ transmitted signals, and each antenna 752 provides a received signal to a respective receiver unit 754. Each receiver unit 754 processes a respective received signal and provides (1) received data symbols to a receive (RX) spatial processor 760y and (2) received pilot symbols to a channel estimator 784y within a controller 780y. Channel estimator 784y derives channel response estimates for the actual or effective MIMO channels between transmitting entity 710 and receiving entity 750y for all data subbands. Controller 780y derives spatial filter matrices based on the MIMO channel response estimates and the steering matrices and in accordance with, e.g., the CCMI or MMSE technique. RX spatial processor 760y performs spatial processing on the received data symbols for each subband with the spatial filter matrix derived for that subband and provides detected symbols for the subband. An RX data processor 770y then processes the detected symbols for all subbands and provides decoded data for each data packet.

Controllers 740, 780x, and 780y control the operation of the processing units at transmitting entity 710 and receiving entities 750x and 750y, respectively. Memory units 742, 782x, and 782y store data and/or program code used by controllers 740, 780x, and 780y, respectively. For example, these memory units may store the set of L pseudo-random steering vectors (SV) and/or steering matrices (SM).

Figure 8:
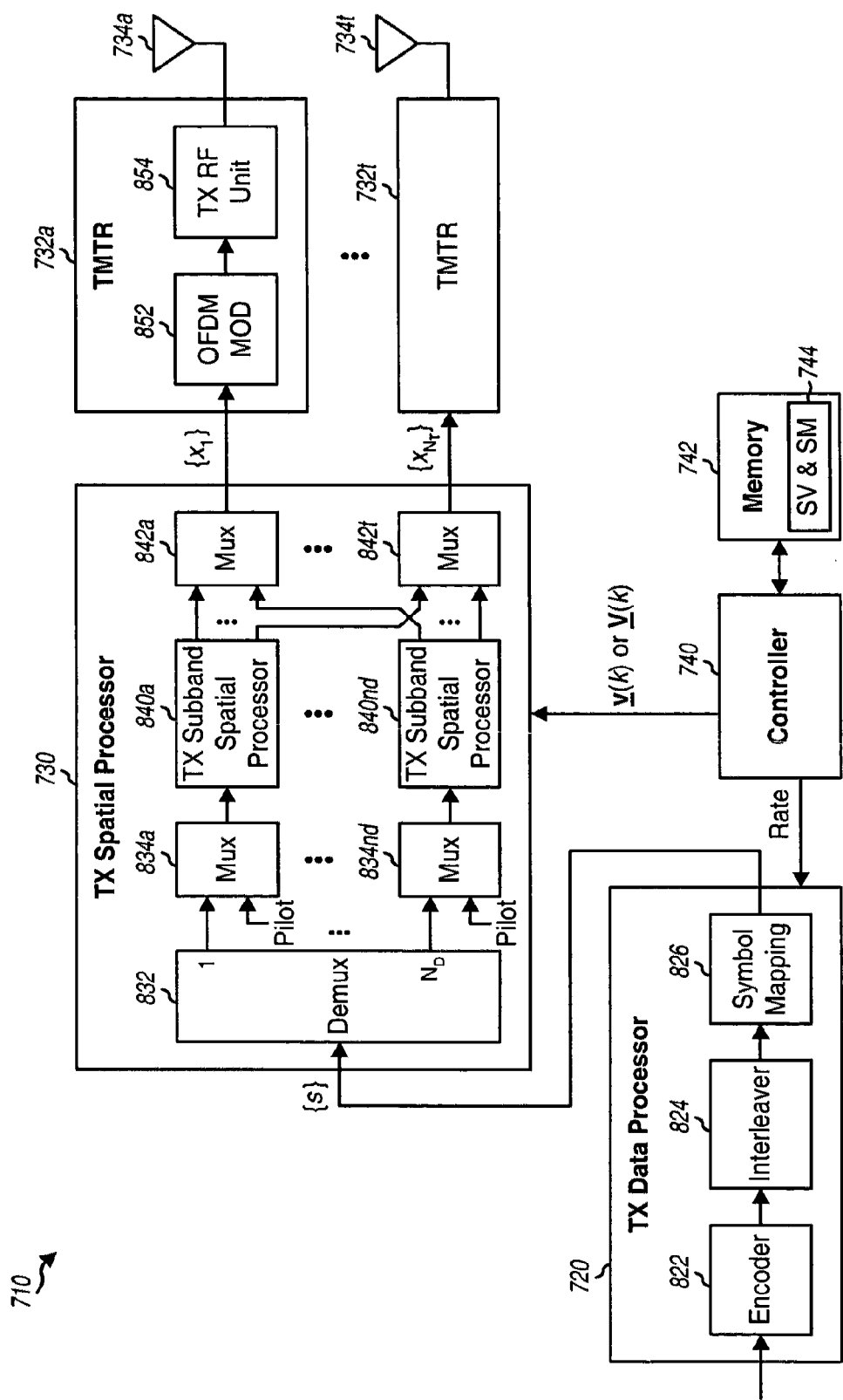
FIG. 8 shows a block diagram of a multi-antenna transmitting entity.

FIG. 8 shows an embodiment of the processing units at transmitting entity 710. Within TX data processor 720, an encoder 822 receives and encodes each data packet separately based on a coding scheme and provides code bits. The coding increases the reliability of the data transmission. The coding scheme may include cyclic redundancy check (CRC), convolutional, Turbo, low-density parity check (LDPC), block, and other coding, or a combination thereof. In the PRTS mode, the SNR can vary across a data packet even if the wireless channel is flat across all subbands and static over the data packet. A sufficiently powerful coding scheme may be used to combat the SNR variation across the data packet, so that coded performance is proportional to the average SNR across the data packet. An interleaver 824 interleaves or reorders the code bits for each data packet based on an interleaving scheme to achieve frequency, time and/or spatial diversity. A symbol mapping unit 826 maps the interleaved bits for each data packet based on a modulation scheme (e.g., QPSK, M-PSK, or M-QAM) and provides a block of data symbols for the data packet. The coding and modulation schemes used for each data packet are determined by the rate selected for that packet.

Within TX spatial processor 730, a demultiplexer (Demux) 832 receives and demultiplexes the block of data symbols for each data packet into $N_D$ data symbol sequences for the $N_D$ data subbands. For each data subband, a multiplexer (Mux) 834 receives pilot and data symbols for the subband, provides the pilot symbols during the preamble and MIMO pilot portions, and provides the data symbols during the signaling and data portions. For each data packet, $N_D$ multiplexers 834a through 834nd provide $N_D$ sequences of pilot and data symbols for the $N_D$ data subbands to $N_D$ TX subband spatial processors 840a through 840nd. Each spatial processor 840 performs spatial processing for the steered or PRTS mode for a respective data subband. For MISO transmission, each spatial processor 840 performs spatial processing on its pilot and data symbol sequence with one or more steering vectors selected for the subband and provides $N_T$ sequences of transmit symbols for the $N_T$ transmit antennas to $N_T$ multiplexers 842a through 842t. For MIMO transmission, each spatial processor 840 demultiplexes its pilot and data symbol sequence into $N_S$ sub-sequences for $N_S$ spatial channels, performs spatial processing on the $N_S$ pilot and data symbol sub-sequences with one or more steering matrices selected for the subband, and provides $N_T$ transmit symbol sequences to $N_T$ multiplexers 842a through 842t. Each multiplexer 842 provides a sequence of transmit symbols for all subbands to a respective transmitter unit 732. Each transmitter unit 732 includes (1) an OFDM modulator (MOD) 852 that performs OFDM modulation on a respective stream of transmit symbols and (2) a TX RF unit 854 that conditions (e.g., converts to analog, filters, amplifies, and frequency upconverts) the stream of OFDM symbols from OFDM modulator 852 to generate a modulated signal.

Figure 9A:
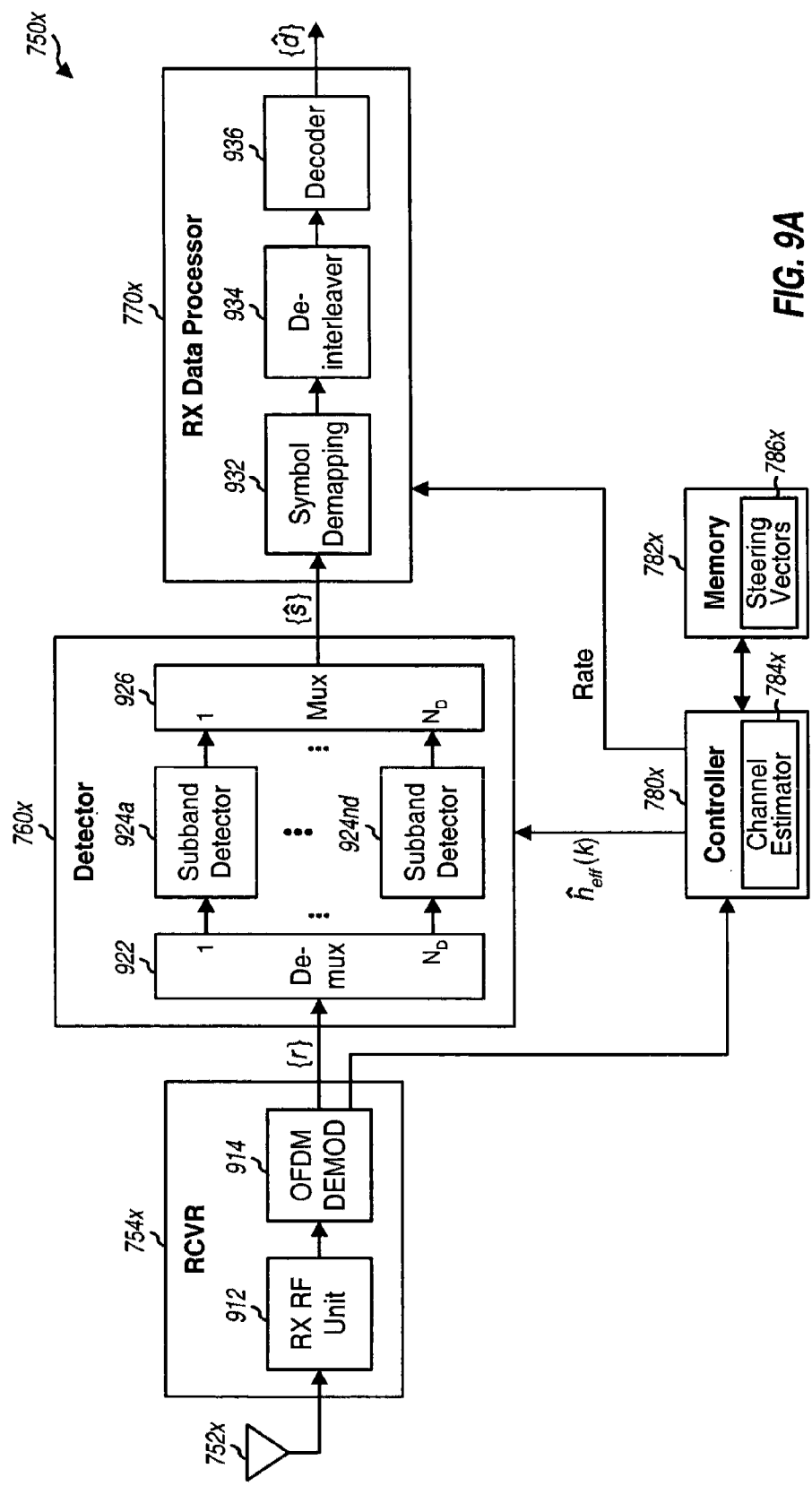
FIG. 9A shows a block diagram of a single-antenna receiving entity.

FIG. 9A shows an embodiment of the processing units at single-antenna receiving entity 750x. Receiver unit 754x includes (1) an RX RF unit 912 that conditions and digitizes the received signal from antenna 752x and provides samples and (2) an OFDM demodulator (DEMOD) 914 that performs OFDM demodulation on the samples, provides received data symbols to detector 760x, and provides received pilot symbols to channel estimator 784x. Channel estimator 784x derives the channel response estimates for the effective SISO channels based on the received pilot symbols and possibly the steering vectors.

Within detector 760x, a demultiplexer 922 demultiplexes the received data symbols for each data packet into $N_D$ received data symbol sequences for the $N_D$ data subbands and provides the $N_D$ sequences to $N_D$ subband detectors 924a through 924nd. Each subband detector 924 performs detection on the received data symbols for its subband with the effective SISO channel response estimate for that subband and provides detected symbols. A multiplexer 926 multiplexes the detected symbols for all data subbands and provides a block of detected symbols for each data packet to RX data processor 770x. Within RX data processor 770x, a symbol demapping unit 932 demaps the detected symbols for each data packet in accordance with the modulation scheme used for that packet. A deinterleaver 934 deinterleaves the demodulated data in a manner complementary to the interleaving performed on the data packet. A decoder 936 decodes the deinterleaved data in a manner complementary to the encoding performed on the data packet. For example, a Turbo decoder or a Viterbi decoder may be used for decoder 936 if Turbo or convolutional coding, respectively, is performed by transmitting entity 710.

Figure 9B:
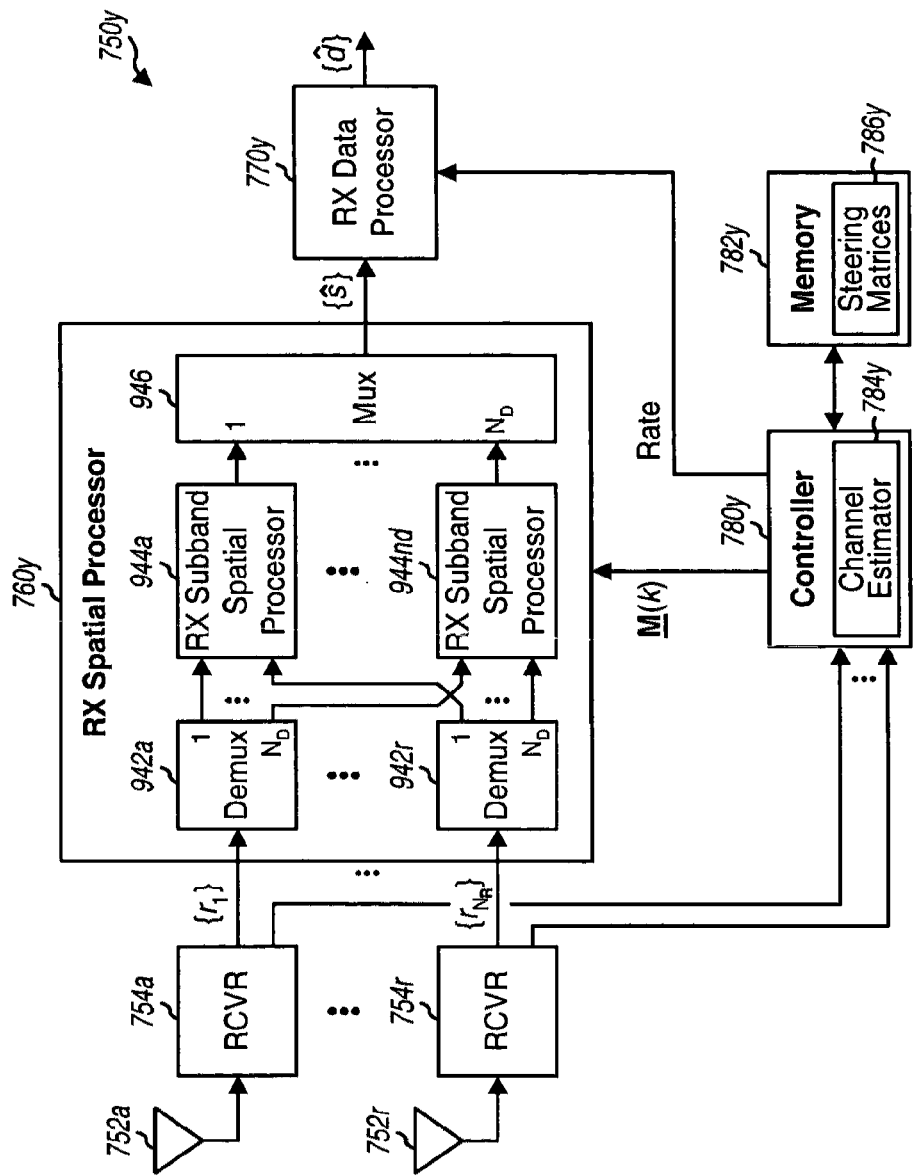
FIG. 9B shows a block diagram of a multi-antenna receiving entity.

FIG. 9B shows an embodiment of the processing units at multi-antenna receiving entity 750y. Receiver units 754a through 754r condition, digitize, and OFDM demodulate the $N_R$ received signals, provide received data symbols to RX spatial processor 760y, and provide received pilot symbols to channel estimator 784y. Channel estimator 784y derives channel response estimates for the MIMO channels based on the received pilot symbols. Controller 780*y* derives spatial filter matrices based on the MIMO channel response estimates and the steering matrices. Within RX spatial processor 760*y*, $N_R$ demultiplexers 942*a* through 942*r* obtain the received data symbols from $N_R$ receiver units 754*a* through 754*r*. Each demultiplexer 942 demultiplexes the received data symbols for each data packet into $N_D$ received data symbol sequences for the $N_D$ data subbands and provides the $N_D$ sequences to $N_D$ RX subband spatial processors 944*a* through 944*nd*. Each spatial processor 944 performs receiver spatial processing on the received data symbols for its subband with the spatial filter matrix for that subband and provides detected symbols. A multiplexer 946 multiplexes the detected symbols for all subbands and provides a block of detected symbols for each data packet to RX data processor 770*y*, which may be implemented with the same design as RX data processor 770*x* in FIG. 9A.

The data transmission techniques described herein may be implemented by various means. For example, these techniques may be implemented in hardware, software, or a combination thereof. For a hardware implementation, the processing units used to perform or support the data transmission techniques at the transmitting and receiving entities may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the data transmission techniques may be implemented with modules (e.g., procedures, functions, and so on) that perform the functions described herein. The software code may be stored in a memory unit (e.g., memory units 742, 782*x* and 782*y* in FIG. 7) and executed by a processor (e.g., controllers 740, 780*x* and 780*y* in FIG. 7). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of transmitting data from a transmitting entity to a receiving entity in a wireless multi-antenna communication system utilizing orthogonal frequency division multiplexing (OFDM), comprising:
   processing a data packet to obtain a block of data symbols;
   demultiplexing pilot symbols and the block of data symbols using OFDM onto a plurality of subbands to obtain, for the data packet, a plurality of sequences of pilot and data symbols for the plurality of subbands; and
   performing spatial processing on the sequence of pilot and data symbols for each subband with at least one steering vector selected for the subband, the spatial processing randomizing a plurality of channels observed by the plurality of sequences of pilot and data symbols sent on the plurality of subbands.

2. The method of claim 1, wherein the sequence of pilot and data symbols for each subband is spatially processed with one steering vector selected for the subband.

3. The method of claim 2, wherein a plurality of different steering vectors are used for the plurality of subbands.

4. The method of claim 2, wherein the one steering vector used for spatial processing for each subband is unknown to the receiving entity.

5. The method of claim 1, wherein the sequence of pilot and data symbols for each subband is spatially processed with at least two steering vectors selected for the subband.

6. The method of claim 1, wherein one pilot or data symbol is sent on each subband in each symbol period, and wherein the sequence of pilot and data symbols for each subband is spatially processed with a different steering vector for each symbol period.

7. The method of claim 1, wherein the at least one steering vector used for spatial processing for each subband is known only to the transmitting entity and the receiving entity.

8. The method of claim 1, wherein the spatial processing with the at least one steering vector for each subband is performed only on the data symbols.

9. The method of claim 1, wherein the processing a data packet includes encoding the data packet in accordance with a coding scheme to obtain coded data,
   interleaving the coded data to obtain interleaved data, and
   symbol mapping the interleaved data in accordance with a modulation scheme to obtain the block of data symbols.

10. The method of claim 1, further comprising:
    selecting the at least one steering vector for each subband from among a set of L steering vectors, where L is an integer greater than one.

11. The method of claim 10, wherein the L steering vectors are such that any pair of steering vectors among the L steering vectors have low correlation.

12. The method of claim 6, further comprising:
    selecting a steering vector for each subband in each symbol period from among a set of L steering vectors, where L is an integer greater than one.

13. The method of claim 1, wherein each steering vector includes T elements having the same magnitude but different phases, where T is the number of transmit antennas at the transmitting entity and is an integer greater than one.

14. An apparatus in a wireless multi-antenna communication system utilizing orthogonal frequency division multiplexing (OFDM), comprising:
    a data processor operative to process a data packet to obtain a block of data symbols;
    a demultiplexer operative to demultiplex pilot symbols and the block of data symbols onto a plurality of subbands to obtain, for the data packet, a plurality of sequences of pilot and data symbols for the plurality of subbands; and
    a spatial processor operative to perform spatial processing on the sequence of pilot and data symbols for each subband with at least one steering vector selected for the subband, the spatial processing randomizing a plurality of effective single-input single-output (SISO) channels observed by the plurality of sequences of pilot and data symbols sent on the plurality of subbands.

15. The apparatus of claim 14, wherein the spatial processor is operative to spatially process the sequence of pilot and data symbols for each subband with one steering vector selected for the subband.

16. The apparatus of claim 14, wherein the spatial processor is operative to spatially process the sequence of pilot and data symbols for each subband with at least two steering vectors selected for the subband.

17. The apparatus of claim 16, wherein the at least two steering vectors for each subband are known only to a transmitting entity and a receiving entity for the data packet.

18. The apparatus of claim 14, wherein each steering vector includes T elements having the same magnitude but different phases, where T is the number of antennas used to transmit the data packet and is an integer greater than one.

19. A method of transmitting data from a transmitting entity to a receiving entity in a wireless multiple-input multiple-output (MIMO) communication system utilizing orthogonal frequency division multiplexing (OFDM), comprising:
processing a data packet to obtain a block of data symbols;
demultiplexing pilot symbols and the block of data symbols using OFDM onto a plurality of subbands; and
performing spatial processing on the pilot and data symbols for each subband with at least one steering matrix selected for the subband, the spatial processing randomizing a plurality of channels for the plurality of subbands observed by the pilot and data symbols sent on the plurality of subbands.

20. The method of claim 19, wherein the pilot and data symbols for each subband are spatially processed with one steering matrix selected for the subband.

21. The method of claim 19, wherein the one steering matrix used for spatial processing for each subband is unknown to the receiving entity.

22. The method of claim 19, wherein the pilot and data symbols for each subband are spatially processed with a different steering matrix for each symbol period.

23. The method of claim 19, wherein the at least one steering matrix used for spatial processing for each subband is known only to the transmitting entity and the receiving entity.

24. The method of claim 19, wherein the spatial processing with the at least one steering matrix for each subband is performed only on the data symbols.

25. The method of claim 24, further comprising: multiplying spread symbols for each subband, obtained from the spatial processing with the at least one steering matrix, to transmit the spread symbols on eigenmodes of the channel for the subband.

26. An apparatus in a wireless multiple-input multiple-output (MIMO) communication system utilizing orthogonal frequency division multiplexing (OFDM), comprising:
a data processor operative to process a data packet to obtain a block of data symbols;
a demultiplexer operative to demultiplex pilot symbols and the block of data symbols onto a plurality of subbands; and
a spatial processor operative to perform spatial processing on the pilot and data symbols for each subband with at least one steering matrix selected for the subband, the spatial processing randomizing a plurality of effective MIMO channels for the plurality of subbands observed by the pilot and data symbols sent on the plurality of subbands.

27. An apparatus in a wireless multi-antenna communication system utilizing orthogonal frequency division multiplexing (OFDM), comprising:
a controller operative to select a first mode for data transmission to a receiving entity if channel response estimates for the receiving entity are unavailable and select a second mode for data transmission to the receiving entity if the channel response estimates are available, wherein data symbols are spatially processed with pseudo-random steering vectors in the first mode and with steering vectors derived from the channel response estimates in the second mode; and
a spatial processor operative to perform spatial processing for each block of data symbols in accordance with the mode selected for the block.

28. A receiver apparatus in a wireless multiple-antenna communication system utilizing orthogonal frequency division multiplexing (OFDM), comprising:
a demodulator operative to provide S sequences of received symbols, obtained via a single received antenna, for S sequences of pilot and data symbols transmitted via S subbands by a transmitting entity, where S is an integer greater than one, and wherein the S sequences of pilot and data symbols are spatially processed with a plurality of steering vectors at the transmitting entity to randomize S effective single-input single-output (SISO) channels observed by the S sequences of pilot and data symbols;
a channel estimator operative to derive channel response estimates for the S effective SISO channels based on received pilot symbols in the S sequences of received symbols; and
a detector operative to perform detection on received data symbols in the S sequences of received symbols based on the channel response estimates for the S effective SISO channels to obtain detected symbols.

* * * * *